United States Patent
Nam et al.

(10) Patent No.: US 11,792,781 B2
(45) Date of Patent: *Oct. 17, 2023

(54) TRANSMIT RESOURCE HANDLING FOR SIDELINK RELAY

(71) Applicant: QUALCOMM Incorporated, San Diego, CA (US)

(72) Inventors: Wooseok Nam, San Diego, CA (US); Tao Luo, San Diego, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,523

(22) Filed: Aug. 4, 2022

(65) Prior Publication Data

US 2022/0377742 A1 Nov. 24, 2022

Related U.S. Application Data

(63) Continuation of application No. 16/942,499, filed on Jul. 29, 2020, now Pat. No. 11,438,899.

(Continued)

(51) Int. Cl.
*H04W 72/04* (2023.01)
*H04L 1/00* (2006.01)
(Continued)

(52) U.S. Cl.
CPC ....... *H04W 72/0466* (2013.01); *H04L 1/0008* (2013.01); *H04W 72/0473* (2013.01); *H04W 92/18* (2013.01)

(58) Field of Classification Search
CPC ......... H04W 72/0466; H04W 72/0473; H04W 92/18; H04W 52/46; H04W 52/346;
(Continued)

(56) References Cited

U.S. PATENT DOCUMENTS

2012/0057523 A1 3/2012 Ji et al.
2012/0201193 A1 8/2012 Sugiyama et al.
(Continued)

FOREIGN PATENT DOCUMENTS

EP 3633898 A1 4/2020
WO 2018128873 A1 7/2018
WO 2019001406 A1 1/2019

OTHER PUBLICATIONS

International Preliminary Report on Patentability—PCT/US2020/044339, The International Bureau of WIPO—Geneva, Switzerland, dated Feb. 17, 2022.

(Continued)

*Primary Examiner* — Candal Elpenord
(74) *Attorney, Agent, or Firm* — Sevan Savsa; ArentFox Schiff LLP

(57) ABSTRACT

An aspect of this disclosure relates to a relay node, and a method of wireless communications by the relay node, including attempting to decode first code block groups of a transport block received in a resource allocation and according to a first encoding configuration. The aspects include identifying a symbol in the resource allocation that includes both of a first part of a successfully decoded one, and a first part of an unsuccessfully decoded one, of the plurality of first code block groups, and determining a modified transmit configuration for the symbol. Further, the aspects include encoding a second part of the successfully decoded one according to the first encoding configuration to define a second code block group that is outside of the symbol. Additionally, the aspects include transmitting the transport (Continued)

block including the one or more second code block groups and the symbol according to the modified transmit configuration.

30 Claims, 18 Drawing Sheets

Related U.S. Application Data

(60) Provisional application No. 62/882,307, filed on Aug. 2, 2019.

(51) Int. Cl.
 *H04W 72/044* (2023.01)
 *H04W 92/18* (2009.01)
(58) Field of Classification Search
 CPC ...... H04W 88/04; H04L 1/0088; H04L 5/003; H04L 2001/0097; H04B 7/1556

USPC .................................................. 370/329–330
 See application file for complete search history.

(56) References Cited

U.S. PATENT DOCUMENTS

| | | |
|---|---|---|
| 2017/0026297 A1 | 1/2017 | Sun et al. |
| 2018/0049220 A1 | 2/2018 | Patil et al. |
| 2018/0109355 A1* | 4/2018 | Werner ................. H04L 1/0089 |
| 2018/0324816 A1 | 11/2018 | Islam et al. |
| 2020/0259600 A1 | 8/2020 | Cao et al. |
| 2020/0295878 A1 | 9/2020 | Choi et al. |
| 2020/0404663 A1* | 12/2020 | Zhang ............... H04W 72/0466 |
| 2021/0037528 A1 | 2/2021 | Nam et al. |
| 2022/0116148 A1 | 4/2022 | Baldemair |

OTHER PUBLICATIONS

International Search Report and Written Opinion—PCT/US2020/044339—ISA/EPO—dated Oct. 28, 2020.

* cited by examiner

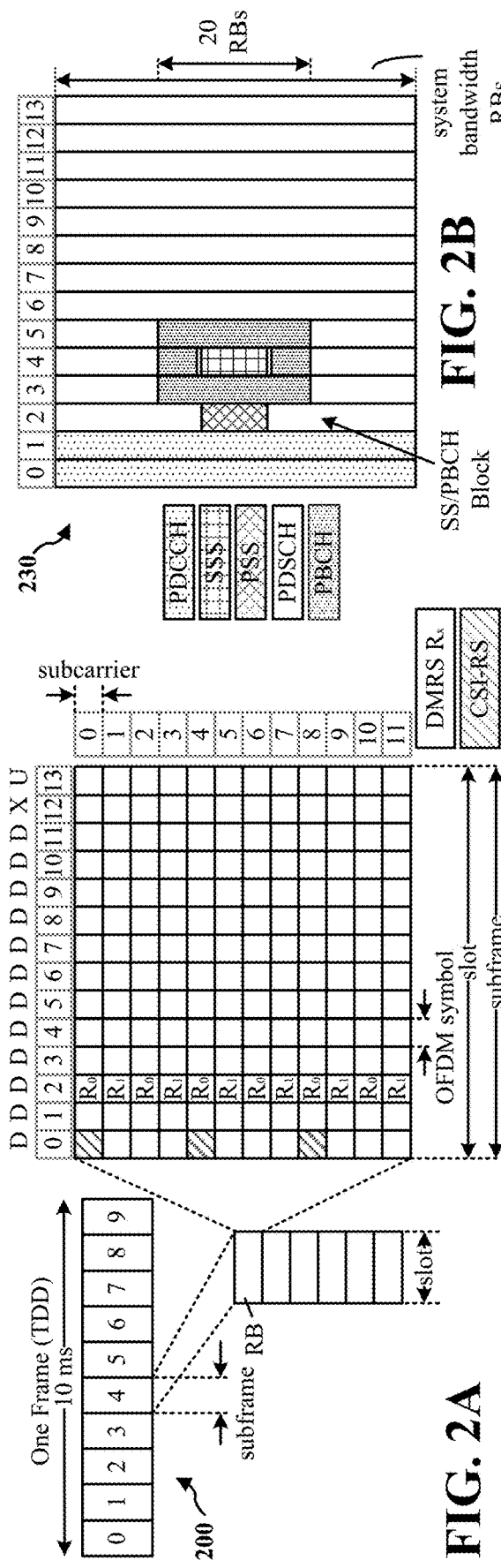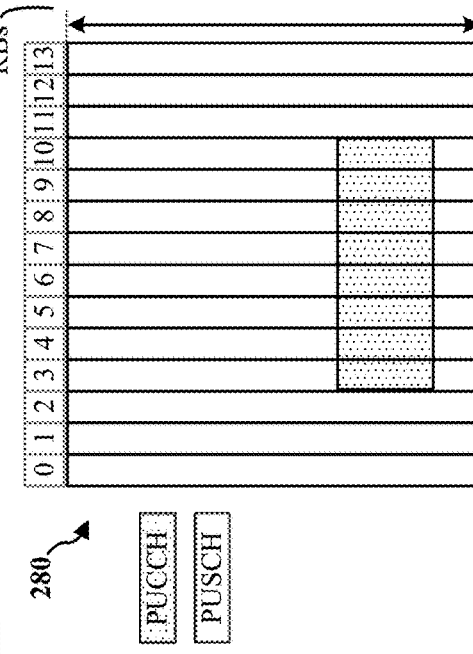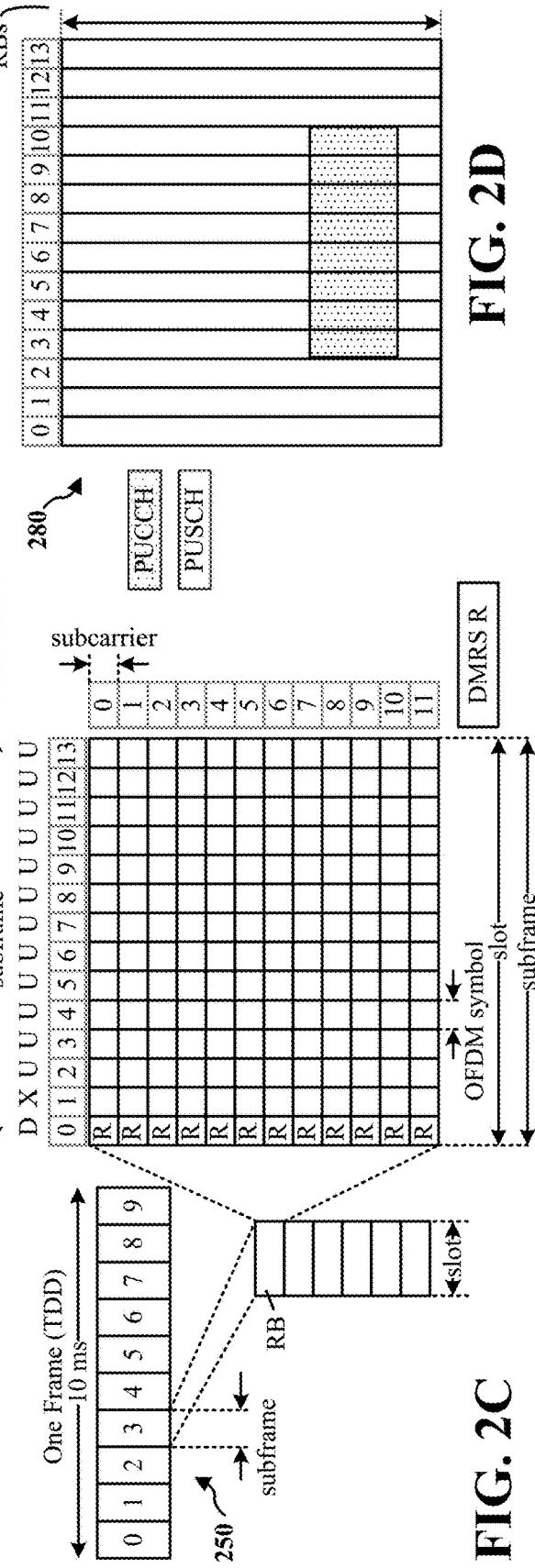
FIG. 2A
FIG. 2B
FIG. 2C
FIG. 2D

TRANSMIT RESOURCE HANDLING FOR SIDELINK RELAY

CROSS-REFERENCE TO RELATED APPLICATION

This application is a Continuation of U.S. patent application Ser. No. 16/942,499, entitled "TRANSMIT RESOURCE HANDLING FOR SIDELINK RELAY," filed Jul. 29, 2020, which claims the benefit of U.S. Provisional Application No. 62/882,307, entitled "TRANSMIT RESOURCE HANDLING FOR SIDELINK RELAY," filed Aug. 2, 2019, both of which are expressly incorporated by reference herein in their entireties.

BACKGROUND

Technical Field

The present disclosure relates generally to communication systems, and more particularly, to transmit resource handling for sidelink relay.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a relay node includes attempting to decode a plurality of first code block groups of a transport block, wherein the plurality of first code block groups are received in a resource allocation and according to a first encoding configuration. The method includes identifying, at the relay node, a symbol in the resource allocation that includes both of a first part of a successfully decoded one of the plurality of first code block groups and a first part of an unsuccessfully decoded one of the plurality of first code block groups, and determining a modified transmit configuration for the symbol. Further, the method includes encoding, at the relay node, a second part of the successfully decoded one of the plurality of first code block groups according to the first encoding configuration to define one or more second code block groups in the resource allocation, wherein the second part of the successfully decoded one of the plurality of first code block groups is outside of the symbol. Additionally, the method includes transmitting, from the relay node, the transport block including the one or more second code block groups according to the resource allocation and the symbol according to the modified transmit configuration.

According to another example, a method of wireless communication by a receiver node includes receiving, via an access link, one or more first transport block portions of a first transport block from a base station. The method also includes receiving, from a sidelink, one or more second transport block portions of the first transport block from a relay node, wherein the one or more second transport block portions are successfully decoded ones of the one or more first transport block portions, wherein the one or more second transport block portions have a second transmission configuration that is a different from a first transmission configuration of the one or more first transport block portions. Additionally, the method includes decoding the one or more first transport block portions and the one or more second transport block portions.

In further aspects, an apparatus for wireless communication is provided that includes a memory and a processor in communication with the memory, wherein the processor is configured to perform the operations of methods described herein.

In other aspects, an apparatus for wireless communication is provided that includes means for performing the operations of methods described herein.

In further aspects, a computer-readable medium stores code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1.

DETAILED DESCRIPTION

Figure 1:
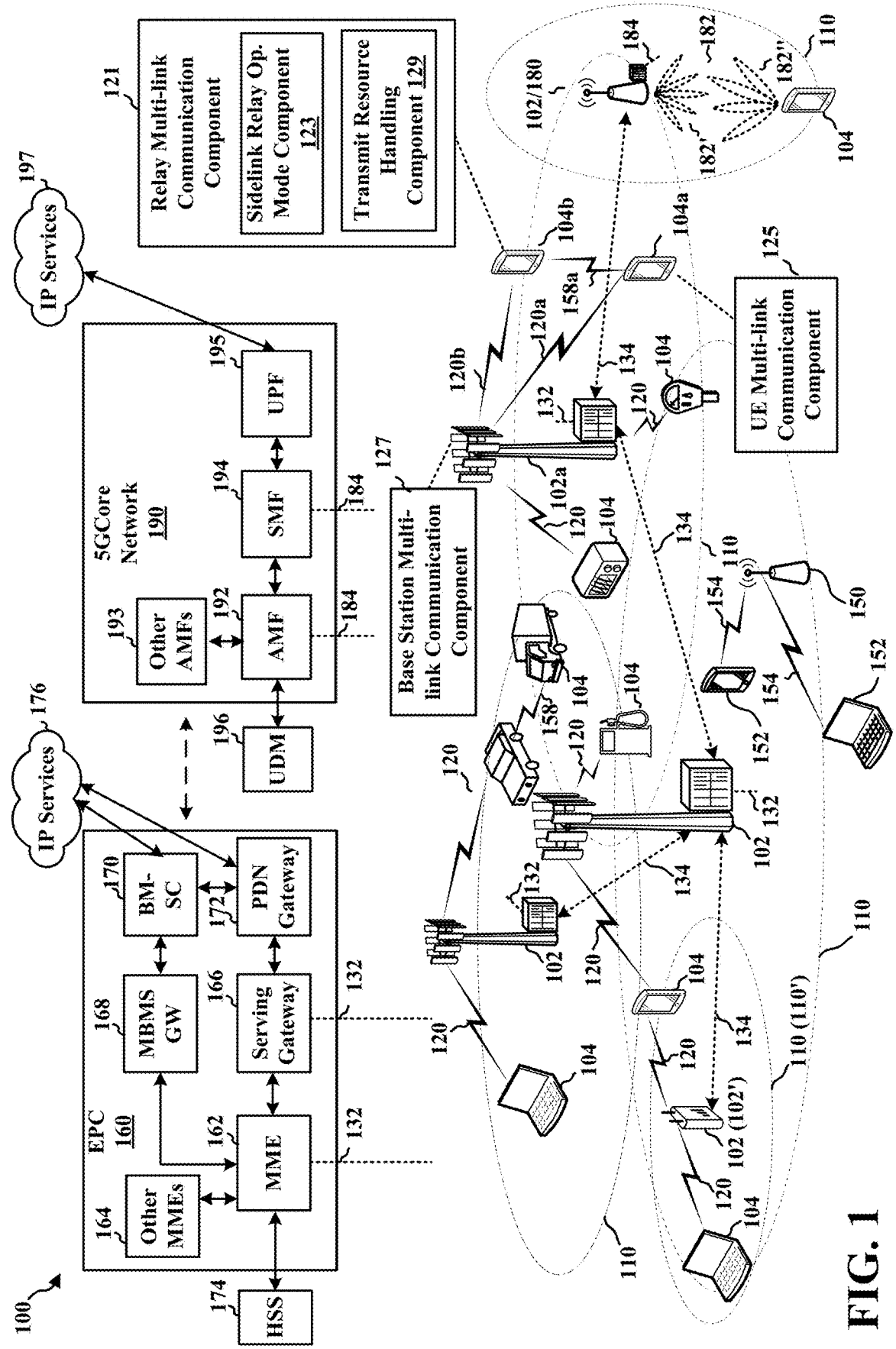
FIG. 1 is a schematic diagram of an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink relay communications, which includes a relay UE relaying communications from a base station over a sidelink to another UE, referred to here as a multi-link UE, or from the multi-link UE via the sidelink to the base station via the access link. The multi-link UE further includes another direct access link to the base station. In this case, as the multi-link UE may exchange communications with the base station independently over both the direct access link and the sidelink, the multi-link UE may be referred to as a sidelink-assisted multi-link UE. Such multi-link communications are desirable, for example, to increase diversity (e.g., redundant data sent over each link) and/or to increase throughput (e.g., different data sent over each link).

Specifically, present disclosure relates to enhancements to the sidelink relay communication configuration, and in particular, to transmit resource handling for sidelink relay, specifically with regard to transport block portion-based (or code block group (CBG) based) sidelink relaying. With transport block portion-based (or code block group (CBG) based) sidelink relaying, the relay UE may re-encode successfully decoded transport block portions (or CBGs), either with the original encoding (of the received transport block portions (or CBGs) or with modified encoding (e.g., relative to the original encoding), before forwarding successfully decoded transport block portions (or CBGs) to the destination node, which may be the sidelink-assisted multi-link UE in a downlink communication, or the base station in an uplink communication. Additionally, such original encoding or modified encoding or the corresponding relaying process may include additional features, such as modified resource allocation, blanking (e.g., no transmission) of unsuccessfully decoded transport block portions (or CBGs), and/or muting (e.g., no transmission) of reference signals associated with blanked transport block portions (or CBGs), all of which may reduce transmission/reception-related resource usage, such as communication overhead, transmit chain resources, receive chain resources, processing resources, memory resources, and/or power resources.

In the operating mode where the relay UE applies the original encoding to the relayed transport block portion (or CBGs), but further applies the blanking and/or muting of data or signals in resource elements of the resource allocation for the relayed transport block portion (or CBGs), may cause fast or abrupt transmit power changes over time in the transmission of symbols in the resource allocation of the relayed transport block portion (or CBGs). Such changes in transmit power over time (e.g., per symbol) may cause signal distortion, inter-symbol interference, and/or phase discontinuity within the transmission of the relayed transport block portion (or CBGs). Such issues may lead to communication inefficiencies, e.g., the inability of the receiver node to decode the transmission leads to re-transmissions, which wastes the transmission/reception-related resource usage, such as communication overhead, transmit chain resources, receive chain resources, processing resources, memory resources, and/or power resources on both the transmitting node (e.g., the relay UE) and the receiving node (e.g., the multi-link UE or the base station).

The present disclosure addresses the issue relating to the change in transmit power over time in the transmission of the relayed transport block portions (or CBGs) by applying one of a plurality of transmit resource handling techniques to reduce or eliminate such transmit power variations. In particular, the relay UE may execute a transmit handling technique including: padding partially blanked symbols to increase the per symbol transmit power; discarding data/signals in partially blanked symbols to entirely blank the symbol to reduce interference and distortion in the symbol; applying power boosting to resource elements containing data or signals in a partially blanked symbol to increase the per symbol transmit power; or, amplify-and-forward an entire unsuccessfully decoded transport block portion (or CBG), instead of blanking it, to maintain the per symbol transmit power. Each of these techniques may reduce or eliminate one or more types of the above-noted waste in transmission/reception-related resource usage that may otherwise occur without using these techniques. Additionally, execution by the relay UE of one of the plurality of transmit resource handling techniques of the present disclosure may further improve channel estimation and/or data decoding performance of the receiving node. Thus, the present disclosure improves the performance and efficiency of the sidelink relay communication configuration.

These and other features of the present disclosure are discussed in detail below with regard to FIGS. 1-18.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a relay UE 104b may include a relay multi-link communication component 121 for assisting with sidelink relay communications between a base station 102a and a sidelink-assisted multi-link UE 104a. The sidelink-assisted multi-link UE 104a may have a first access link 120a directly with the base station 102a, and a second communication link with the base station 102a via a sidelink 158a with the relay UE 104b, which has a second access link 120b to the base station 102a. The relay multi-link communication component 121 of the relay UE 104b may include a sidelink relay operation mode component 123, which may be selectively configured to operate according to a modified data encoding relay mode or a non-modified data encoding relay mode.

Correspondingly, the sidelink-assisted multi-link UE 104a may include a UE multi-link communication component 125 configured to manage communications with both the relay UE 104b via the sidelink 158a and the base station 102a via the access link 120a.

Similarly, the base station 102a may include a base station multi-link communication component 127 configured to manage communications with both the relay UE 104b via the access link 120b and the sidelink-assisted multi-link UE 104a via the access link 120a.

Additionally, the relay UE 104b may include a transmit resource handling component 129 that is configured to modify transmit resources for relayed transport block portions (or code block groups) to reduce or eliminate abrupt changes in per-symbol transmit power level, as is discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including relay UE 104b and sidelink-assisted multi-link UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as relay UE 104b and sidelink-assisted multi-link UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102 and the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which, for a particular set of subcarriers (carrier system bandwidth), subframes within the set of subcarriers are dedicated for either DL or UL, or may be TDD in which, for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. A UE 104 uses the PSS to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
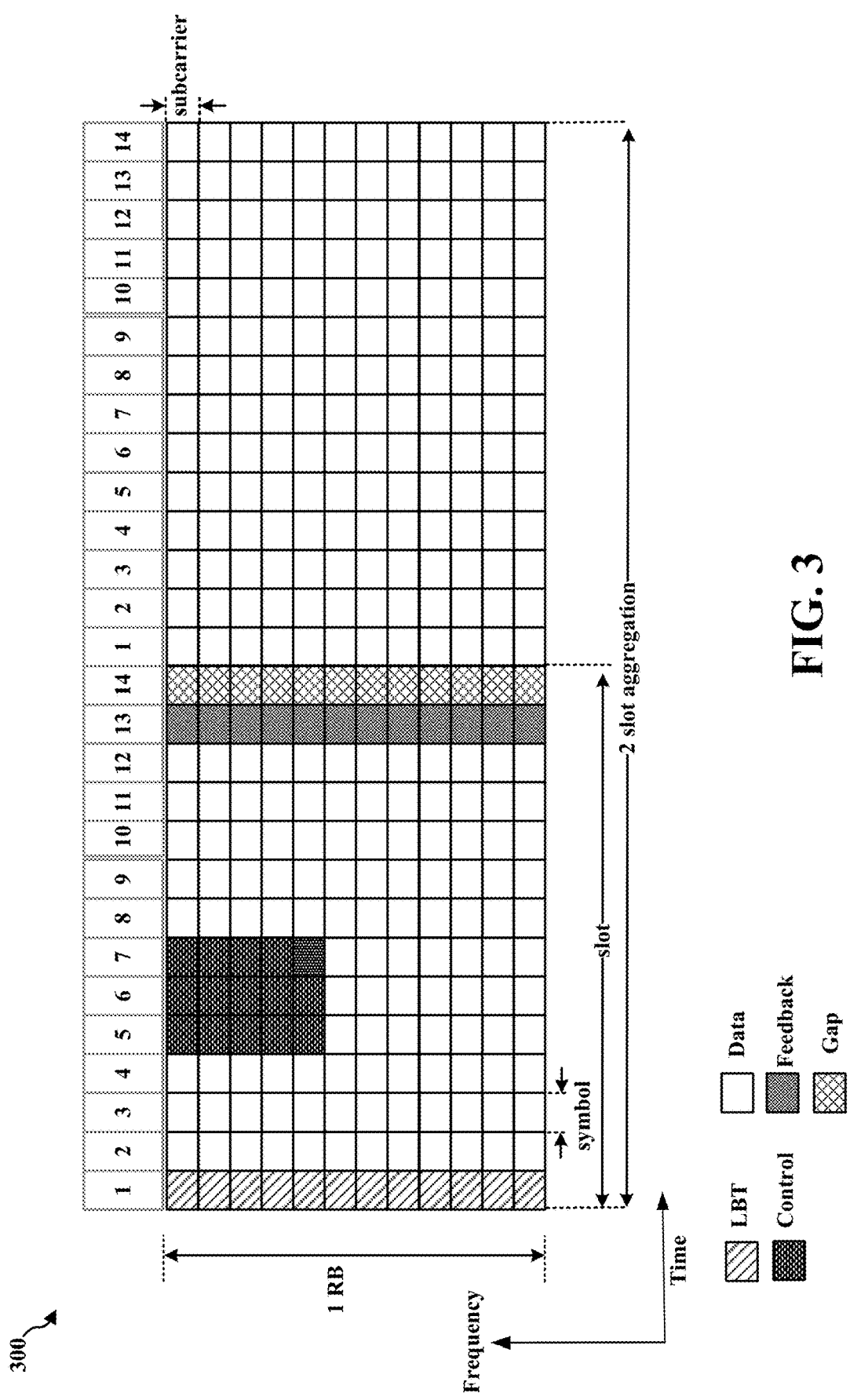
FIG. 3 is a diagram of an example frame structure and resources for sidelink communications between two of the communicating nodes in the system of FIG. 1.

FIG. 3 is a diagram 300 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
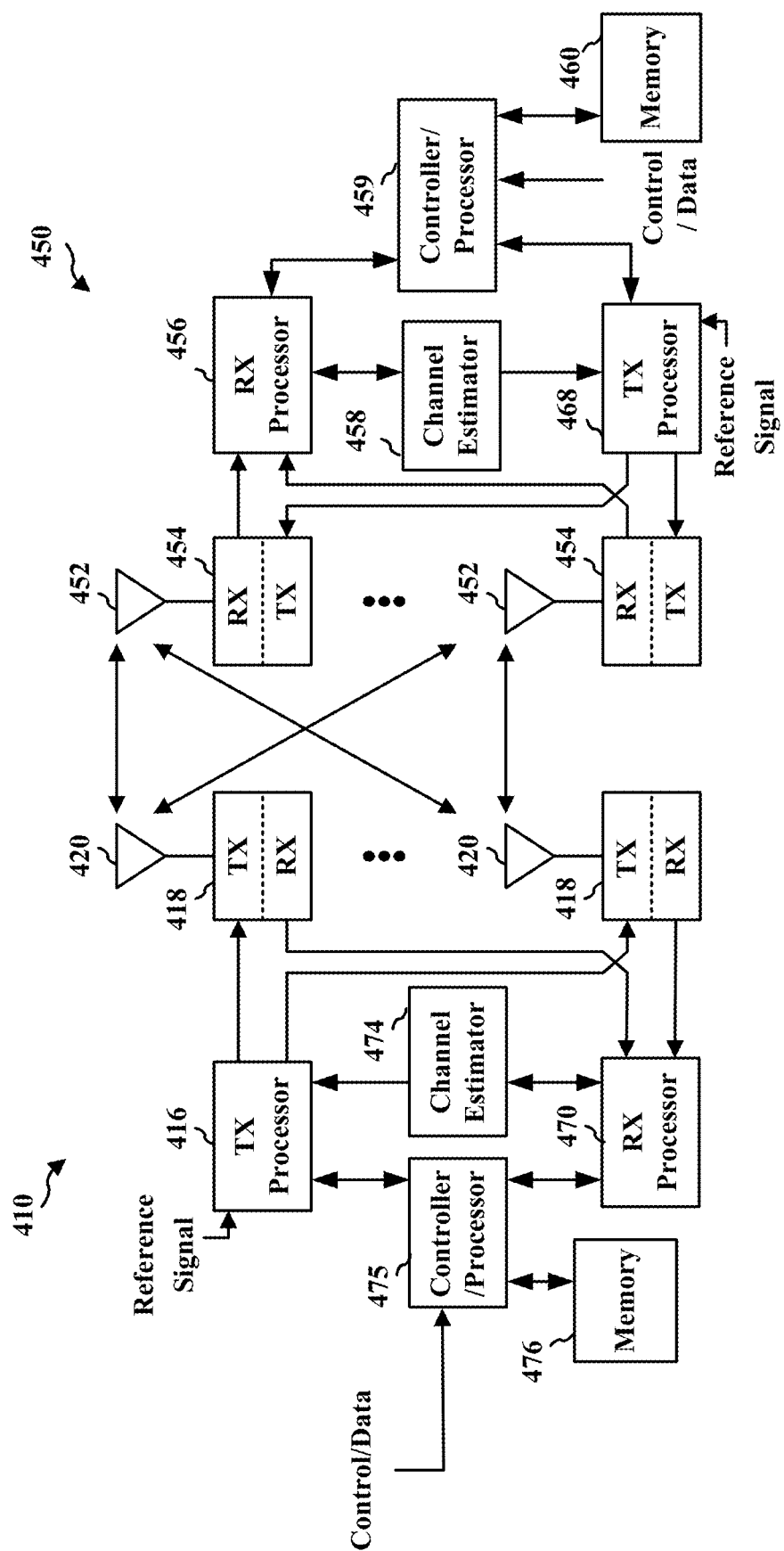
FIG. 4 is a schematic diagram of an example of hardware components of two of the communicating nodes in the system of FIG. 1.

FIG. 4 is a diagram of hardware components of an example transmitting and/or receiving (tx/rx) nodes 410 and 450, which may be any combinations of base station 102-UE 104 communications, and/or UE 104-UE 104 communications in system 100. For example, such communications may include, but are not limited to, communications such as a base station transmitting to a relay UE, a relay UE transmitting to a multi-link UE, a multi-link UE transmitting to a relay UE, or a relay UE transmitting to a base station in an access network. In one specific example, the tx/rx node 410 may be an example implementation of base station 102 and where tx/rx node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the tx/rx node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the tx/rx node 450. If multiple spatial streams are destined for the tx/rx node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the tx/rx node 410. These soft decisions may be based on channel estimates computed by the channel estimator 458. The soft decisions are then decoded and deinterleaved to recover the data and control signals that were originally transmitted by the tx/rx node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the tx/rx node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the tx/rx node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the tx/rx node 410 in a manner similar to that described in connection with the receiver function at the tx/rx node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, 125, and/or 127 of FIG. 1.

In an implementation, at least one of the TX processor 416, the RX processor 470, and the controller/processor 475 may be configured to perform aspects in connection with components 121, 125, and/or 127 of FIG. 1.

Figure 5:
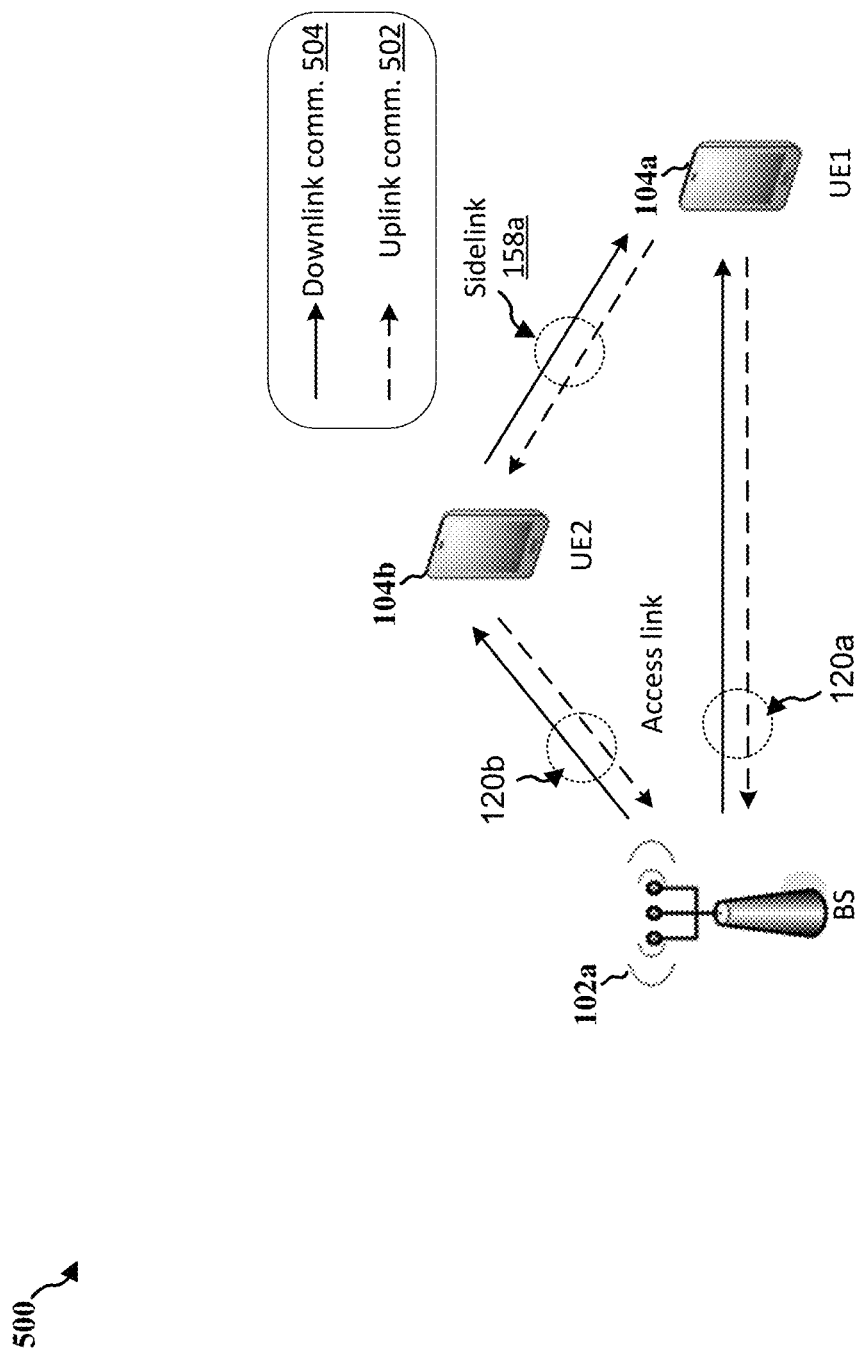
FIG. 5 is a schematic diagram of an example of a sidelink relay communication configuration operable in the system of FIG. 1.
Figure 6:
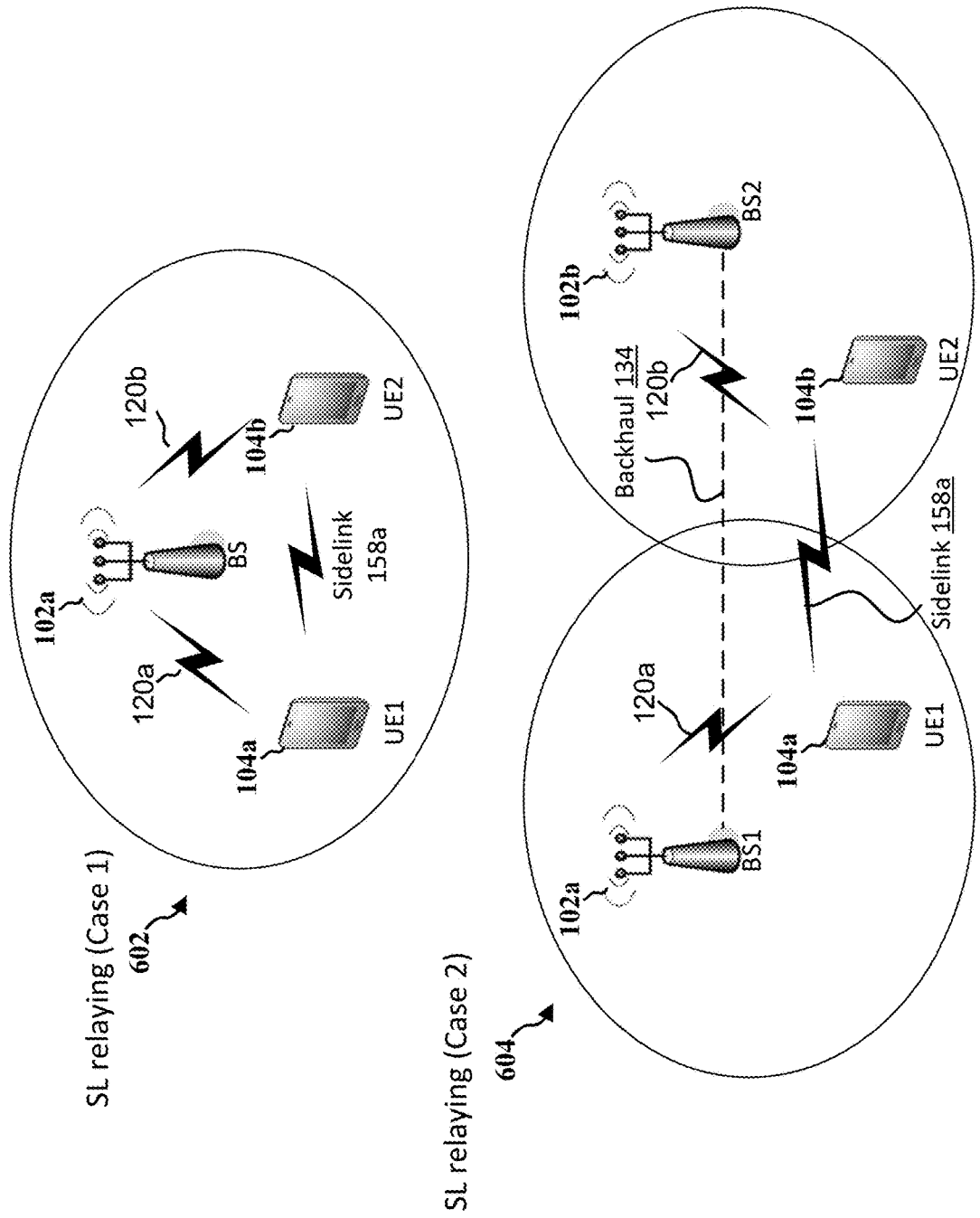
FIG. 6 is a schematic diagram of two different examples of a sidelink relay communication configuration operable in the system of FIG. 1.

Referring to FIGS. 5 and 6, the present aspects generally relate to a sidelink relay communication scenario 500, 602, and/or 604 that includes relaying communications over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink relay communication scenario 500, 602, and/or 604, a sidelink-assisted multi-link UE 104a may establish a multi-link communication with one or more base stations 102a and/or 102b over two or more communication links, which include at least one direct link and at least one indirect link via a sidelink with a relay UE 104b. In a first case, such as in the sidelink relay communication scenarios 500 and 602, the sidelink-assisted multi-link UE 104a directly communicates with the base station 102a via a first access link (AL) 120a, and indirectly communicates with the base station 102a via a sidelink 158a with the relay UE 104b, which has a second access link 120b with the base station 102a. In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a PC5 interface in 4G LTE and/or in 5G NR technologies. In any case, the sidelink relay communication scenario 500, 602, and/or 604 may be utilized for improved diversity, e.g., sending the same data over two links (access link and sidelink), and/or improved throughput, e.g., sending different, independent data over each link. In an implementation, in a mmW system, this type of multi-link communication may be attained using multiple transmit/receive beams and multiple antenna panels (sub-arrays) between the UEs and/or between a respective UE and a respective base station/gNB.

Further, in a second case, such as in the sidelink relay communication scenario 604, the sidelink-assisted multi-link UE 104a may establish multiple links with multiple base stations 102a and 102b, which may be referred to as a multi-transmit-receive point (multi-TRP) architecture. In this case, the sidelink-assisted multi-link UE 104a directly communicates with the base station 102a via a first access link (AL) 120a, and indirectly communicates with the base station 102b via a sidelink 158a with the relay UE 104b, which has a second access link 120b with the base station 102b. Additionally, in this case, the base stations 102a and 102b may exchange communications over a backhaul link 134a.

Additionally, in the sidelink relay communication scenario 500, 602, and/or 604, the communications exchanged between the base station 102a/102b, relay UE 104b, and sidelink-assisted multi-link UE 104a may be uplink (UL) communications 502 and/or downlink (DL) communications 504 (see FIG. 5).

Figure 7:
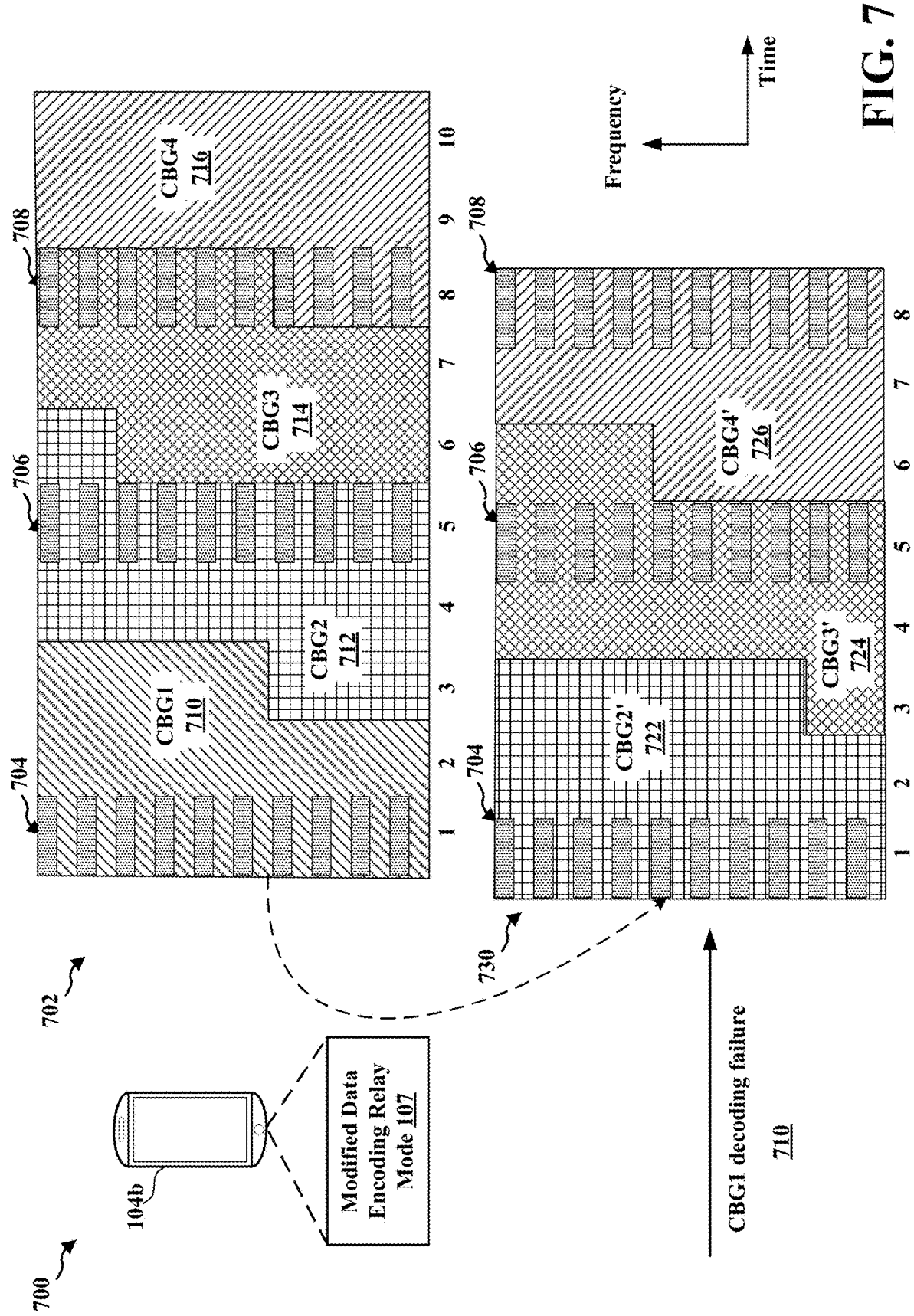
FIG. 7 is a schematic diagram of example received and transmitted transport blocks according to operation of a modified data encoding relay mode of a relay UE operable in the system of FIG. 1.
Figure 8:
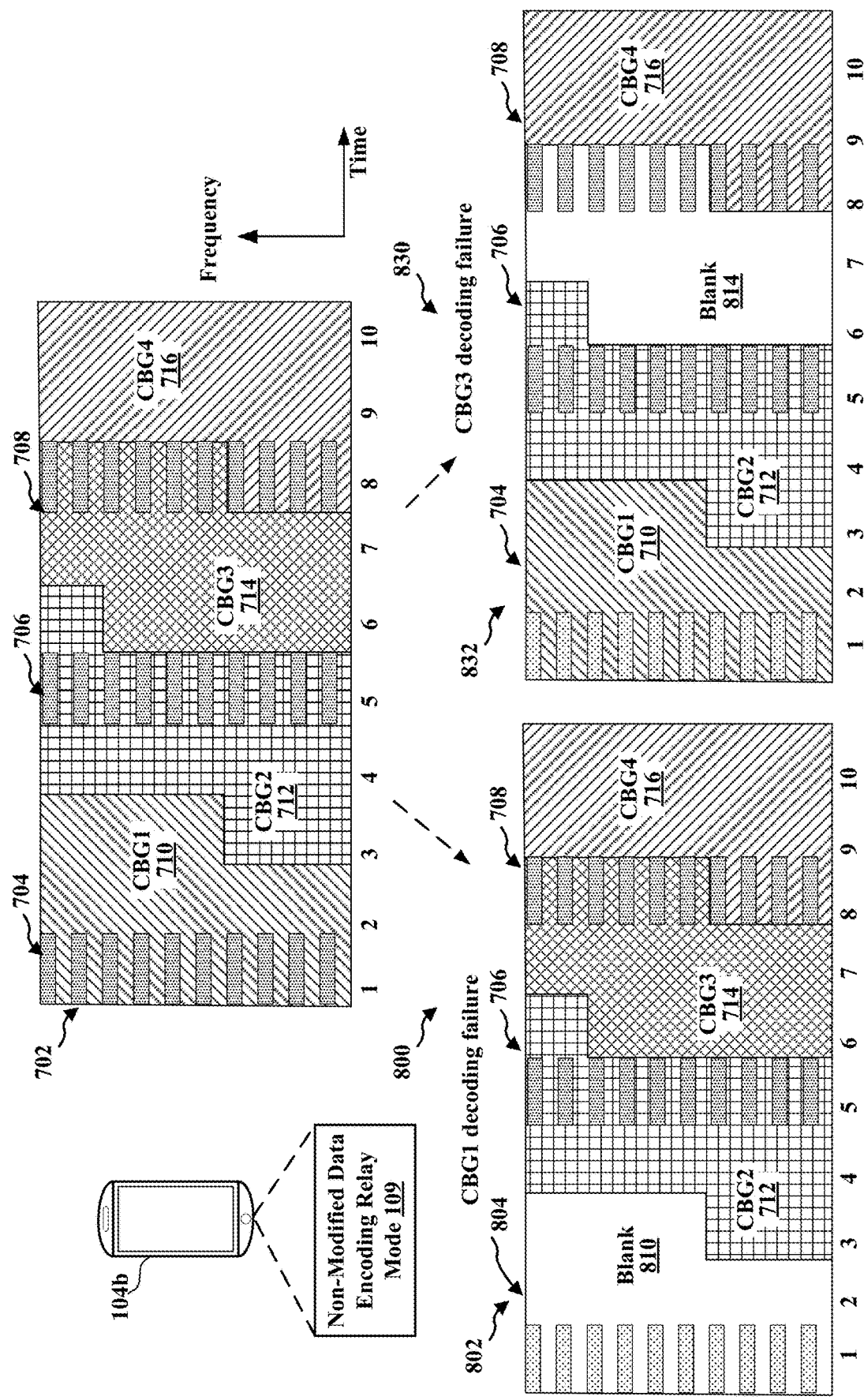
FIG. 8 is a schematic diagram of examples of received and transmitted transport blocks according to operation of a non-modified data encoding relay mode of a relay UE operable in the system of FIG. 1.
Figure 9:
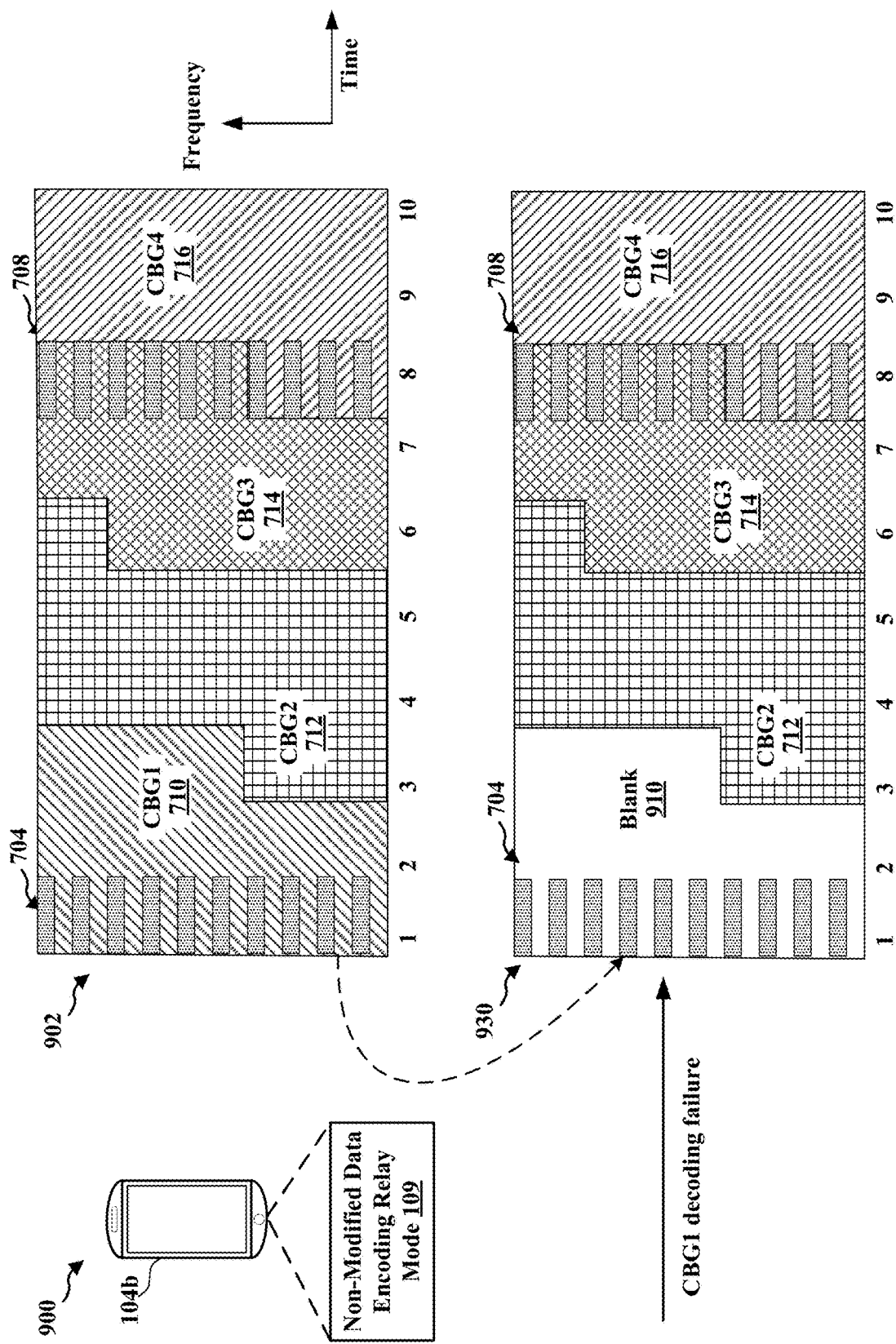
FIG. 9 is a schematic diagram of another example of received and transmitted transport blocks according to operation of a non-modified data encoding relay mode of a relay UE operable in the system of FIG. 1.

Referring to FIGS. 7-9, the present disclosure relates to enhancements to the sidelink relay communication scenario 500, 602, and/or 604 (FIGS. 5 and 6), and in particular to transport block portion-based (or code block group (CBG) based) sidelink relaying. In particular, the present disclosure provides apparatus and methods in which the relay UE 104b may re-encode successfully decoded transport block portions (or CBGs), either with new encoding or the original encoding, before forwarding the successfully decoded transport block portions (or CBGs) to the sidelink-assisted multi-link UE 104a, e.g., in a DL communication 504, or to the base station 104a or 104b, e.g., in a UL communication 502. For instance, the relay UE 104b may support multiple relay operational modes, including either a modified data encoding relay mode 107 or a non-modified data encoding relay mode 109, which may be setup on the relay UE 104b by a received configuration message (e.g., from base station 102a/102b or from sidelink-assisted multi-link UE 104a).

During operation according to the modified data encoding relay mode 107 (see FIG. 7), the relay UE 104b can modify successfully decoded transport block portions (or CBGs) while re-encoding the data for relaying to the receiver node, e.g., the sidelink-assisted multi-link UE 104a for DL communications 504 or the base station 102a/102b for UL communications 504. In an example, the modified encoding/relayed transmission parameters may include one or any combination of a redundancy value (RV), a modulation and coding scheme (MCS), a resource allocation, a rank, or any other transmission-related parameter for sending the data, of the re-encoded transport block portions (or CBGs) that are being relayed by the relay UE 104b can be different from the corresponding parameter used in the transmission of the original, received transport block portions (or CBGs). In some implementations of this mode, the receiver node (the base station 102a or 102b, e.g., in a UL communication 502, or to the sidelink-assisted multi-link UE 104a, e.g., in a DL communication 504) may first demodulate/decode transport block portions (or CBGs) from the AL 120a/102b and SL 158a separately and combine them (i.e., soft-combining) to improve reliability. Additionally, in some implementations of this mode, the relay UE 104b may convey additional control information via a sidelink message, e.g., by PSSCH or PUCCH, to inform the receiver node of the modified encoding, resource allocation, etc.

During operation according to the non-modified data encoding relay mode 109 (see FIGS. 8 and 9), the relay UE 104b does not modify successfully decoded transport block portions (or CBGs) while re-encoding the data for relaying to the receiver node, e.g., the sidelink-assisted multi-link UE 104a for DL communications 504 or the base station 102a/102b for UL communications 504. In other words, the encoding/relayed transmission parameters, which may include one or any combination of an RV, an MCS, a resource allocation, a rank, or any other transmission-related parameter for sending the data, of the re-encoded transport block portions (or CBGs) that are being relayed by the relay UE 104b are maintained to be the same as the corresponding parameter used in the transmission of the original, received transport block portions (or CBGs). In some implementations of this mode, the relay UE 104b may transmit a "blank transport block portion" (or a "blank CBG") for the transport block portions (or CBGs) of a decoding failure. In other words, for any unsuccessfully decoded transport block portion (or CBG) of a transport block having data for another node, e.g., a transport block or part thereof that is being relayed, the relay UE 104b operating in the non-modified data encoding relay mode 109 may "blank" the corresponding resource elements, which means that the relay UE 104b may not transmit any data in the corresponding resource element. Also, in some implementations of this mode, if a symbol in the resource allocation of the transport block portions (or CBGs) includes a reference signal, such as but not limited to a demodulation reference signal (DMRS), and if the symbol only overlaps with blank transport block portions (or CBGs), then the transmission of the reference signal in the symbol may be muted, e.g., the entire symbol may be blanked or no transmission may occur in the symbol. For instance, the reference signal-muting or -blanking may be based on a rule, such as but not limited to being based on a number or density of reference signal resources being less than a threshold number, a relative position with respect to other non-blanked transport block portions (or CBGs) being less than a relative position threshold, etc., or by an explicit indication (e.g., received from the base station 102a/102b or the sidelink-assisted multi-link UE 104a). In other words, as long as there is no significant performance impact, the reference signal can be muted. For example, if the number of DMRS symbols is large, muting one of them may not have any strong performance impact. Additionally, in some implementations of this mode, the receiver node (the base station 102a or 102b, e.g., in a UL communication 502, or to the sidelink-assisted multi-link UE 104a, e.g., in a DL communication 504) may perform pre-demodulation (or pre-demapping) combining of the transport block portions (or CBGs) from the different links (e.g., AL 120a and sidelink 158a) for reduced complexity, which may be beneficial for low-complexity receiver devices (e.g., UEs that have relatively low processing and/or memory capabilities). As used herein, a low-complexity device means a low-tier/low-capability device. For example, wireless sensors or meters, and IoT tags may have limited processing capability due to low-cost implementation (e.g., full modem features such as those for smartphone will not implemented on these types of devices). Also, those devices may operate with non-rechargeable/non-replaceable batteries, so low power consumption is necessary, which further limits processing capability.

As such, the selection/configuration of the relay UE 104b to operate according to the modified data encoding relay mode 107 or the non-modified data encoding relay mode 109 may depend on the capability or preference of the relay UE 104*b* and/or of the sidelink-assisted multi-link UE 104*a*. The modified data encoding relay mode 107 may entail smaller radio resources for relaying but, at the same time, may entail more control overhead and more processing at the receiver/destination node, because the two paths (access link and relay path) should be separately demodulated/decoded. On the other hand, the non-modified data encoding relay mode 109 may entail more radio resources for relaying but may entail less processing at the receiver/destination node, which would be beneficial for less-capable UEs, such as low-complexity/low-power devices.

Referring specifically to FIG. 7, an example modified encoding sidelink relay communication scenario 700 for the relay UE 104*b* operating according to the modified data encoding relay mode 107 includes the relay UE 104*b* receiving an original transport block 702 and relaying an encoding-modified transport block 730 for either UL communication 502 or DL communication 504. The original transport block 702 includes a resource allocation of a plurality of resources in both frequency (resource elements (REs) and/or resource blocks (RBs)) and time (e.g., OFDM symbols 1 to 10), including first, second, and third reference signal (e.g., DMRS) symbols 704, 706, 708 and first, second, third, and fourth transport block portions (or CBGs) 710, 712, 714, and 716. In this scenario, the relay UE 104*b* experiences a decoding failure of the first transport block portion (or first CBG) 710.

As a result, based on operating according to the modified data encoding relay mode 107, the relay UE 104*b* is configured to perform a relaying transmission, such as for a sidelink communication, by encoding the successfully encoded second, third, and fourth transport block portions (or CBGs) 712, 714, and 716 according to a different encoding configuration, as compared to the encoding configuration of second, third, and fourth transport block portions (or CBGs) 712, 714, and 716 of the original transport block 702, to generate transport block portions (or CBGs) 722, 724, and 726 of a relayed transport block 730.

Additionally, in this case, the resource allocation of transport block portions (or CBGs) 722, 724, and 726 in relayed transport block 730 changes, relative to the resource allocation of the corresponding second, third, and fourth transport block portions (or CBGs) 712, 714, and 716 of the original transport block 702. In particular, based on operating according to the modified data encoding relay mode 107, the relay UE 104*b* may forward only the successfully decoded transport block portions (or CBGs), and thus may omit unsuccessfully decoded portions/groups, and hence utilize less resources for transmitting the relayed transport block 730. In this case, for example where the relay UE 104*b* experiences a decoding failure of the first transport block portion (or first CBG) 710, the relay UE 104*b* may shift the transport block portions (or CBGs) 722, 724, and 726 to fill up the original location of the resource allocation for the first transport block portion (or first CBG) 710.

Referring to FIG. 8, example non-modified encoding with blanking sidelink relay communication scenarios 800 and 830 include the relay UE 104*b* operating according to the non-modified data encoding relay mode 109, receiving the original transport block 702 (e.g., same as in FIG. 7), and relaying a non-encoding-modified, partially blanked transport block 802 (for scenario 800) or 832 (for scenario 830) for either UL communication 502 or DL communication 504.

Notably, the non-encoding-modified, partially blanked transport block 802 in scenario 800 includes muting of reference signals within a symbol including a blanked transport block portion (or a blanked CBG). For example, scenario 800 includes the relay UE 104*b* experiencing a decoding failure of the first transport block portion (or first CBG) 710. In response and based on operating according to the non-modified data encoding relay mode 109, the relay UE 104*b* may replace the unsuccessfully decoded first transport block portion (or first CBG) 710 with blank resources or a blank portion/block 810. Additionally, in response to identifying a symbol, e.g., symbol 1 in this case, including only the blank portion/block 810, and not any successfully decoded transport block portions (or CBGs), e.g., the second, third, and fourth transport block portions (or CBGs) 712, 714, and 716, the relay UE 104*b* operating according to the non-modified data encoding relay mode 109 may mute the first reference signal symbol 704 (e.g., DMRS symbols) within the blank block 810, as represented by muted reference signal symbol 804. In other words, no reference signal symbols are transmitted by the relay UE 104*b* when the resource allocation in the transport block includes a muted reference signal symbol. Thus, in scenario 800, the relay UE 104*b* blanks unsuccessfully decoded transport block portions (or CBGs) and mutes reference signal symbols associated with only the blanked unsuccessfully decoded transport block portions (or CBGs).

In contrast, in scenario 830, the relay UE 104*b* operating according to the non-modified data encoding relay mode 109 generates the non-encoding-modified, partially blanked transport block 832 in a manner that avoids muting of reference signals within a symbol including a blanked transport block portion (or a blanked CBG) when the symbol also includes resources occupied by successfully decoded transport block portions (or CBGs). For example, scenario 830 includes the relay UE 104*b* experiencing a decoding failure of the third transport block portion (or third CBG) 714. In response and based on operating according to the non-modified data encoding relay mode 109, the relay UE 104*b* may replace the unsuccessfully decoded third transport block portion (or third CBG) 714 with blank resources or a blank portion/block 814. Additionally, in response to identifying a symbol, e.g., symbol 8 in this case, including the blank portion/block 810 and a successfully decoded transport block portion (or CBG), e.g., fourth transport block portion (or fourth CBG) 716 in this case, the relay UE 104*b* operating according to the non-modified data encoding relay mode 109 may not mute the corresponding third reference signal symbol (e.g., DMRS symbols) 708 within symbol 8 that includes the blank block 814. For example, in some cases, the relay UE 104*b* operating according to the non-modified data encoding relay mode 109 may execute a rule or receive an indication to not mute reference signal symbols within a symbol. In an example, which should not be construed as limiting, the rule or indication may dictate to not mute reference signals within a symbol, for instance, when blanked resources and non-blanked resources both are present in the symbol, e.g., the symbol is partially blanked. It should be noted, however, that the relay UE 104*b* does blank the resource elements within symbol 8 of the third unsuccessfully decoded transport block portions (or third CBGs) 714. Thus, in scenario 830, the relay UE 104*b* blanks unsuccessfully decoded transport block portions (or CBGs) and avoids muting reference signal symbols associated with both blanked transport block portions (or blanked CBGs) and successfully decoded transport block portions (or CBGs).

Referring to FIG. 9, another example non-modified encoding with blanking sidelink relay communication scenario 900 includes the relay UE 104*b* operating according to the non-modified data encoding relay mode 109, receiving an original transport block 902 (similar to original transport block 702 in FIG. 7, but without second reference signal symbol 706), and relaying a non-encoding-modified, non-muted reference signal transport block 930 for either UL communication 502 or DL communication 504. Notably, scenario 900 is somewhat similar to scenario 800, however, the first reference signal (or DMRS) symbol 704 is not muted, even though it is within blank portion/block 910. For example, in some cases, the relay UE 104b operating according to the non-modified data encoding relay mode 109 may execute a rule or receive an indication to not mute reference signal symbols within blanked portions/blocks. In an example, which should not be construed as limiting, the rule or indication may dictate to not mute reference signals within a blanked portion/block, for instance, when the number or density of reference signal resources is under a threshold, or when their relative position to other non-blanked transport block portions (or CBGs) is over a threshold. For example, the rule or indication may be configured to not mute reference signal symbols when such muting may affect the demodulation/decoding performance of a subsequent transport block portion (or CBG) in the transport block. In scenario 900, if the first reference signal (or DMRS) symbol 704 is muted, it may affect the demodulation/decoding performance of the transport block portion (or CBG) 712, because it does not contain any reference signal and is relatively far apart from the next reference signal symbol 708. Thus, in scenario 900, the relay UE 104b blanks unsuccessfully decoded transport block portions (or CBGs) and avoids muting reference signal symbols associated with the blanked transport block portions (or blanked CBGs).

Figure 10:
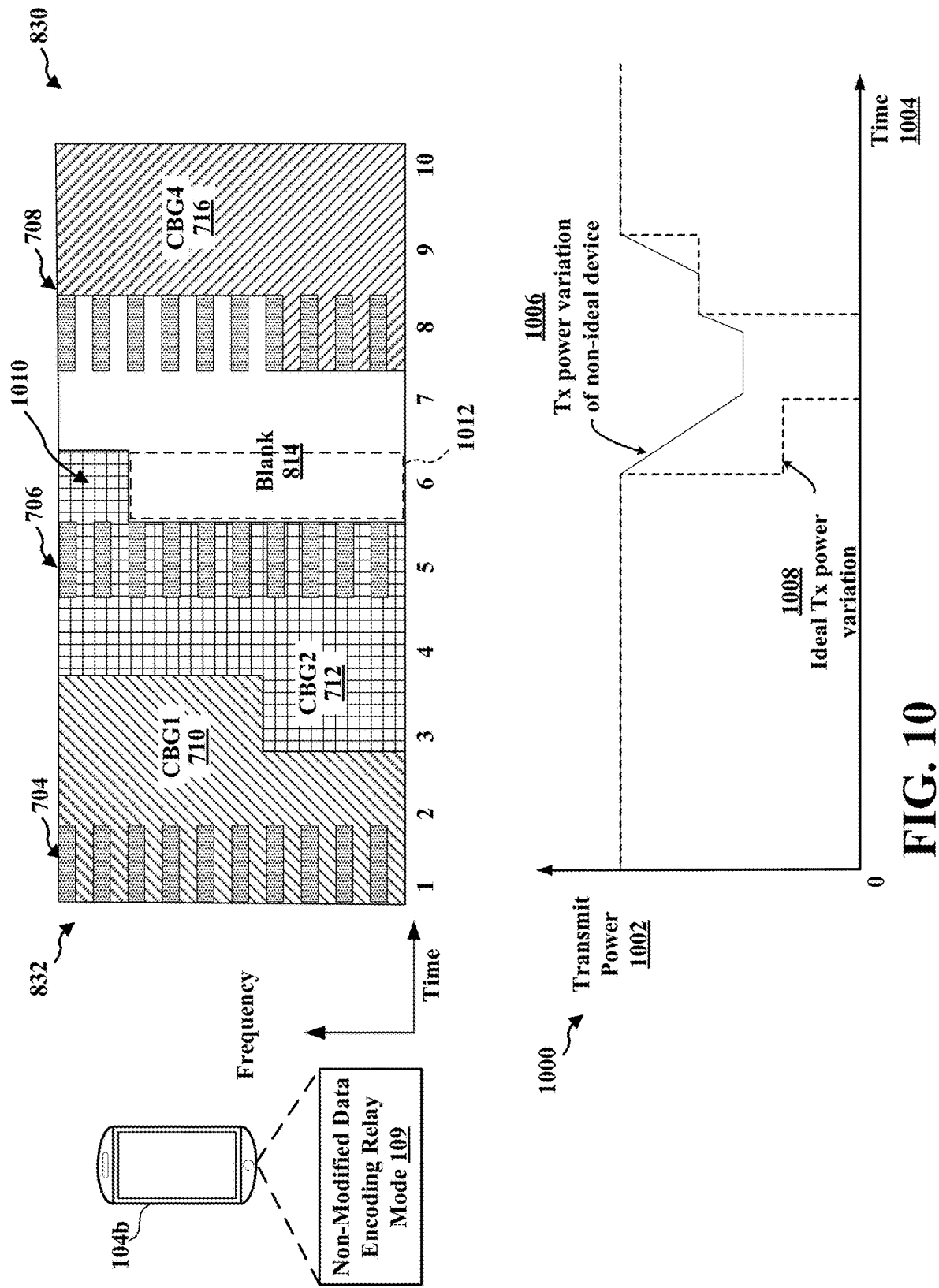
FIG. 10 is a graph of an example of variable transmit power over time for a relayed transport block with transport block portions (or CBGs) having modified encoding.

Referring to FIG. 10, graph 1000 includes an example of a difference between an ideal/expected transmit power variation 1008 and an actual transmit power variation 1006 that is supported by a non-ideal/practical device in transmitting a relayed transport block with transport block portions (or CBGs) having original encoding but including blanking or muting. As used herein, the ideal/expected transmit power variation 1008, if achieved by the relay UE 104b, does not cause signal distortion, inter-symbol interference, and/or phase discontinuity within the transmission of the relayed transport block portion (or CBGs), which may lead to communication inefficiencies. However, the ideal transmit power variation 1008 may include abrupt changes, which requires an extremely high or virtually infinite slew rate of a modem or transmitter of transmit chain component (e.g., power amplifier) at the relay UE 104b, and thus may be impossible to achieve. In contrast, the non-ideal/practical device with a finite slew rate of a modem or transmitter or transmit chain component may only be able to achieve the actual transmit power variation 1006, which can cause signal distortion, inter-symbol interference, and/or phase discontinuity within the transmission of the relayed transport block portion (or CBGs).

In particular, in this example, the relayed transport block with transport block portions (or CBGs) having original encoding is the same as the non-encoding-modified, partially blanked transport block 832 described above in FIG. 8 for sidelink relaying scenario 830. In scenario 830, the relay UE 104b fails to decode the third transport block portion (or third CBG) 714 (see FIG. 8). In response and based on operating according to the non-modified data encoding relay mode 109, the relay UE 104b may replace the unsuccessfully decoded third transport block portion (or third CBG) 714 with the blank resources/blank portion/block 814. This operation leaves transport block 832 with a partially blanked symbol 6, including a first set of resource elements (REs) (or occupied bandwidth (BW)) 1010 associated with second transport block portion (or second CBG) 712, and a second set of REs (or occupied BW) 1012 associated with blanked portion 814 (associated with unsuccessfully decoded third transport block portion (or third CBG) 714). This operation also leaves symbol 7 wholly blanked, and symbol 8 partially blanked (including reference signals 708 and REs occupied by the fourth transport block portion 716). The partially blanked symbols 6 and 8, and the fully blanked symbol of transport block 832 cause abrupt per-symbol transmit power variations which leads to a discrepancy between the ideal transmit power variation 1008 and the actual transmit power variation 1006 of the non-ideal/practical device.

In general, the per-symbol transmit power of the relay UE 104b in transmitting a transport block may depend on the number of occupied REs (or occupied BW) in each symbol of the transport block. For instance, if all REs have the same energy, the transmit power for the symbol may be proportional to the number of allocated REs.

In the example of transport block 832, symbol 6, 7, and 8 may have different transmit power. Ideally, symbol 7 has zero transmit power, however, since boundaries between the transport block portions (or CBGs) are not symbol-aligned, some symbol may be partially occupied, e.g., symbol 6 in this case, due to blank blocks, e.g., block 814 in this case, and thus has a smaller transmit power relative to the other occupied symbols.

Abrupt change in the value of the transmit power 1002 across the transport block 832 may cause issues such as, but not limited to, signal distortion and/or inter-symbol interference, e.g., in non-ideal device having a low slew rate that is not able to support abrupt changes in transmit power 1002, and/or an inability to maintain phase continuity of the transmit signal when transmitting the transport block 832.

The present disclosure provides apparatus and methods of transmit resource handling for partially or fully muted symbols, as in the example of transport block 832, which reduce and/or eliminate transmit power per-symbol variations, and hence reduce or eliminate signal distortion, inter-symbol interference, and/or phase discontinuity issues caused by such per-symbol transmit power variations.

The present disclosure provides the relay UE 104b with the transmit resource handling component 129 (FIG. 1), which may use one or more of the following transmit resource handling techniques to avoid abrupt transmit power variations when transmitting relayed transport blocks according to the non-modified data encoding relay mode 109: padding partially blanked symbols to increase the per symbol transmit power; discarding data/signals in partially blanked symbols to entirely blank the symbol to reduce interference and distortion in the symbol; applying power boosting to resource elements containing data or signals in a partially blanked symbol to increase the per symbol transmit power; or, amplify-and-forward an entire unsuccessfully decoded transport block portion (or CBG), instead of blanking it, to maintain the per symbol transmit power. Each of these techniques executed by the transmit resource handling component 129 may generate or apply a modified transmit configuration for the partial symbol to reduce or eliminate the above-noted transmission/reception issues.

These techniques are discussed in detail with reference to FIGS. 11-14, which are explained with reference to the original transport block 702 being relayed by the relay UE 104b executing non-modified data encoding relay mode 109 and the transmit resource handling component 129, and according to scenario 830. In this case of scenario 830, the second transport block portion (or CBG) 712 is successfully decoded and the third transport block portion (or CBG) 714 is unsuccessfully decoded, and thus the typical operation of non-modified data encoding relay mode 109 would result in symbols 6 and 8 being partially blanked and symbol 7 being fully blanked.

Figure 11:
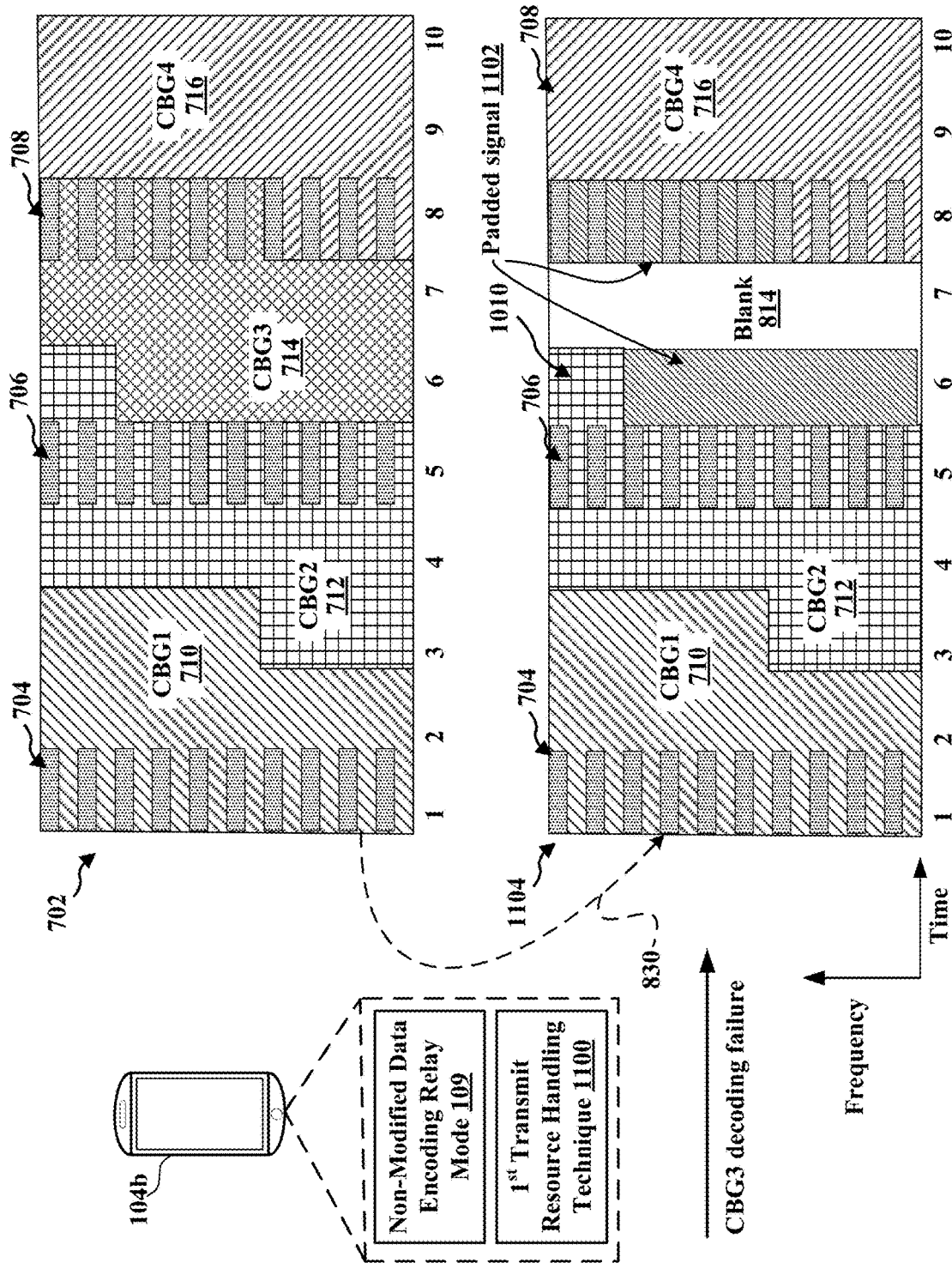
FIG. 11 is a schematic diagram of an example transmit resource handling technique.

Referring to FIG. 11, an example of a first transmit resource handling technique 1100 executed by the relay UE 104b includes generating or applying a modified transmit configuration to pad partial symbols. As used here, a partial symbol is a symbol in a transport block that includes at least one RE having a transport block portion (or CBG), e.g., 710, 712, 714, 716, or at least one reference signal, e.g., 704, 706, 708. In this case, the relay UE 104b may execute the first transmit resource handling technique 1100 to map a padded signal 1102 to all or part of the blanked resource elements of the partial symbol to avoid abrupt per-symbol transmit power variations. The padded signal 1102 may be a signal having characteristics known to a receiver node, such as but not limited to a known sequence. As such, the receiver node (e.g., the sidelink-assisted multi-link UE 104a for DL communications 504, and the base station 102a for UL communications 502) can use the known, padded signal 1102 as an additional reference signal (RS) to improve channel estimation/data decoding performance. Presence of the padded signal 1102 can be indicated to the receiver node by the relay UE 104b via a control message, or the receiver node may blindly try to detect the presence of the known sequence. In some implementations of the first transmit resource handling technique 1100, wholly-blanked symbols (e.g., where the blanking portion occupies all REs of the symbol) may not be padded with padding signal 1102, as a wholly-blanked symbol has nothing transmitted, which avoids some of the above-noted issues, and as a null transmission would be ignored by the receiver node.

For instance, in one example as applied in scenario 830 where the third transport block portion (or third CBG) 714 is replaced with blanking portion 814 based on executing the non-modified data encoding relay mode 109, the relay UE 104b further executes the first transmit resource handling technique 1100 to map the padded signal 1102 to all or part of the blanked resource elements corresponding to blanking portion 814 in partial symbols 6 and 8. In the illustrated example, all of the blanked REs in symbol 6 and all of the blanked REs in symbol 8 are replaced with the padded signal 1102. It should be understood, however, that less than all of the blanked REs in a partial symbol may be replaced with the padded signal 1102. For example, less than all of the blanked REs may be replaced in the case where the number of REs in a symbol having padded signals 1102 and/or transport block portions (or CBGs) (e.g., 710, 712, 714, or 716) and/or reference signals (e.g., 704, 706, or 708) have a per-symbol transmit power greater than a threshold transmit power, or have a per-symbol transmit power delta (e.g., difference), relative to an adjacent, transmitted symbol, less than a threshold delta. In this case, a value of threshold transmit power, or the threshold delta may correspond to a capability of the relay UE 104b to adjust to changes in the per-symbol transmit power. In other words, the intention of partial padding is to increase the transmit power just to the extent that the relay UE 104b can handle the transmit power variation, e.g., such that the delta in transmit power is less than the capability of the relay UE 104b.

Thus, in this case, the relay UE 104b executing the first transmit resource handling technique 1100 generates transport block 1104 that includes padding in partial symbols for relaying to the receiver node.

Figure 12:
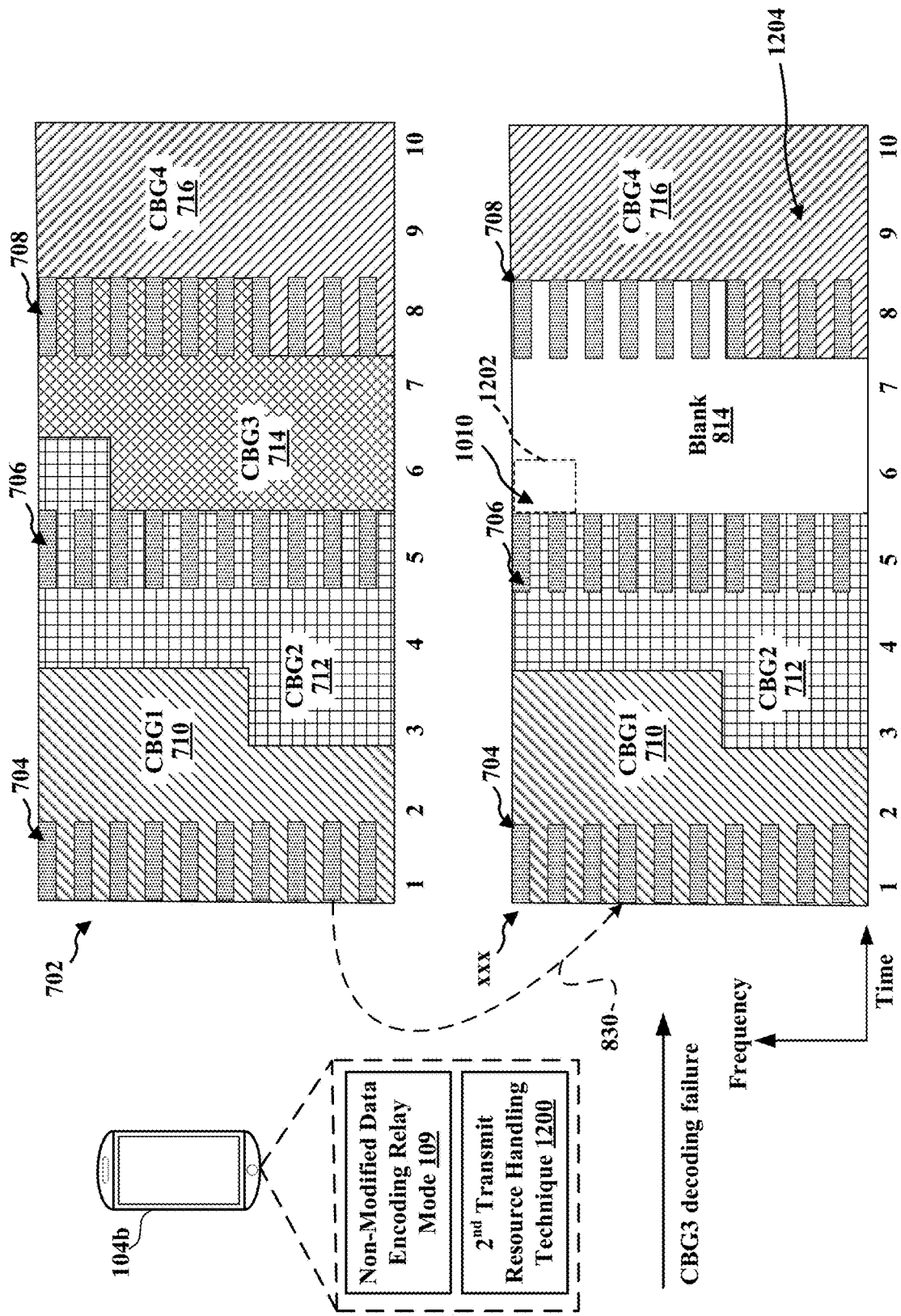
FIG. 12 is a schematic diagram of another example transmit resource handling technique.

Referring to FIG. 12, an example of a second transmit resource handling technique 1200 executed by the relay UE 104b includes generating or applying a modified transmit configuration to discard partial symbols. As used here, discarding a partial symbol means that the relay UE 104b fully blanks the partially-blanked or partially-occupied symbol. In an implementation, for example, if a portion of used (not-blanked) REs in the symbol is under a certain (configurable) threshold, the relay UE 104b may blank the whole symbol (e.g., replace all REs with a blanked portion or blank REs). As such, the relay UE 104b would have a null transmission for this symbol. In some implementations, the second transmit resource handling technique 1200 may include a rule that identifies a partial symbol containing an RS (e.g., DMRS) as an exception, and the relay UE 104b may not discard or fully blank such a symbol. This exception may be used to improve operation of the receiving node (e.g., the sidelink-assisted UE 104a or base station 102a), for example, as partial symbols including an RS may be utilized by the receiving node to improve channel estimation and/or data decoding of a subsequent transport block portion (or CBG) in the transport block.

For instance, in one example as applied in scenario 830 where the third transport block portion (or third CBGs) 714 is replaced with blanking portion 814 based on executing the non-modified data encoding relay mode 109, the relay UE 104b may further execute the second transmit resource handling technique 1200 to determine whether to map an additional blanking portion 1202 to the remaining used (non-blanked) REs in an identified partial symbol, such as symbol 6 and symbol 8 in this scenario. For example, the relay UE 104b may map the additional blanking portion 1202 to the occupied REs 1010 in symbol 6 corresponding to the second transport block portion 712. In an implementation, the occupied REs 1010 may be replaced by the additional blanking portion 1202 when the number of the occupied REs 1010 is less than a threshold number.

Similarly, the relay UE 104b may identify partial symbol 8 and determine whether additional blanking may be applied based on the second transmit resource handling technique 1200. In the example scenario, the UE 104b may determine to not replace the occupied REs in symbol 8, for example, either because the number of occupied REs 1204 corresponding to the second transport block portion 712 exceed the threshold number, and/or by executing the exception based on the presence of reference signals 708 in symbol 8.

Thus, in this case, the relay UE 104b executing the second transmit resource handling technique 1200 generates transport block 1206 that includes one or more additional blanking portions 1202 in one or more partial symbols for relaying to the receiver node.

Figure 13:
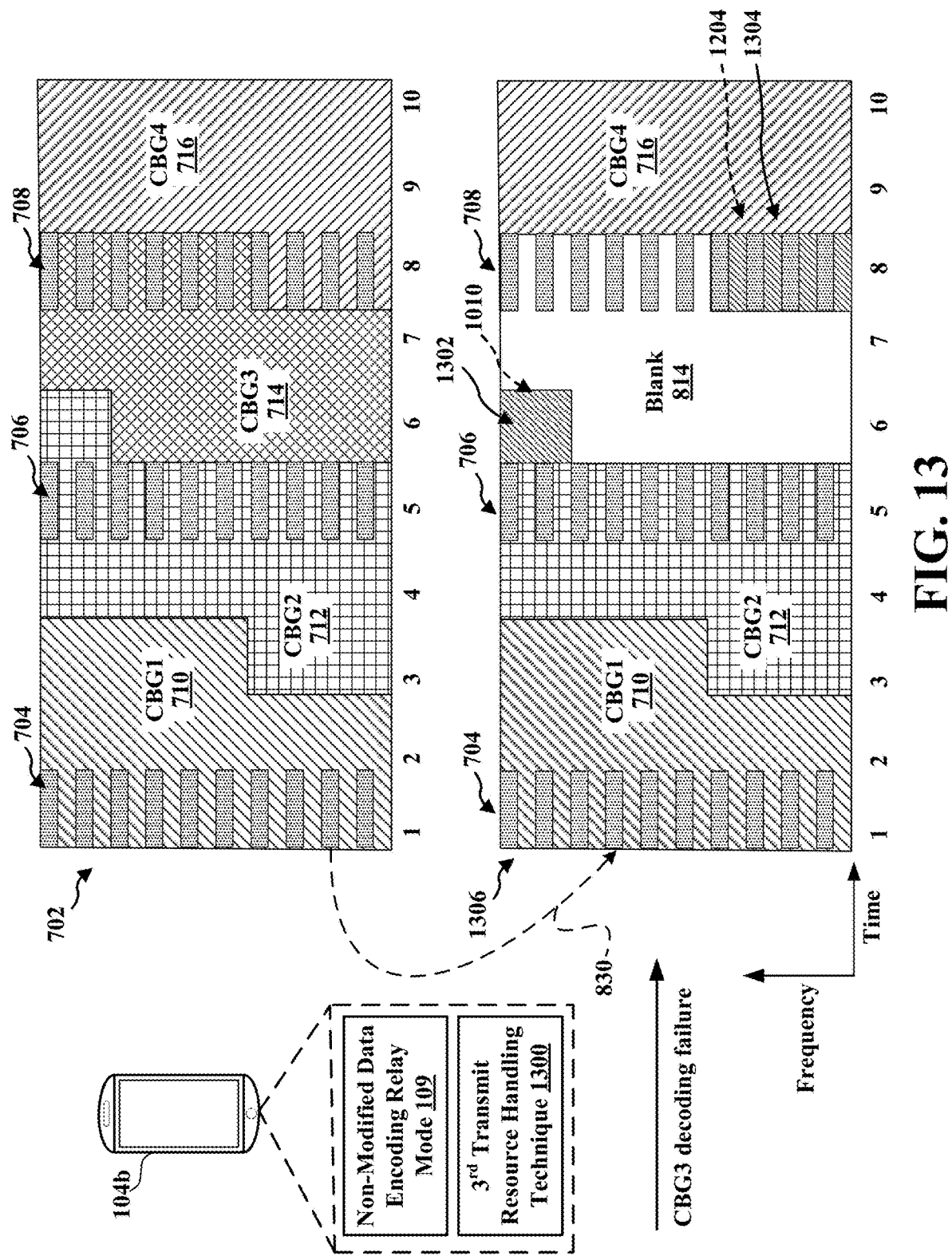
FIG. 13 is a schematic diagram of an example transmit resource handling technique.

Referring to FIG. 13, an example of a third transmit resource handling technique 1300 executed by the relay UE 104b includes generating or applying a modified transmit configuration to power boost a partial symbol. As used here, power boosting includes increasing a transmit power of one or more occupied REs in one or more partial symbols to increase the energy per RE (EPRE) of the REs used in the partial symbol to avoid an abrupt transmit power change. For instance, the relay UE 104b executing the third transmit resource handling technique 1300 may identify a transmit power of the partial symbol, compare the transmit power to a threshold transmit power, and if the transmit power is less than the threshold transmit power, execute a function to boost power in one or more REs of the partial symbol by an amount determined to increase the transmit power of the partial symbol to a value that meets or exceeds the threshold transmit power. In some cases, the amount of power boosting may be limited so as to not exceed a maximum EPRE. In some implementations, the third transmit resource handling technique 1300 may further include a rule that the EPRE for a RS (e.g., reference signals 704, 706, and 708) may not be boosted, as this may distort channel estimation processing by a receiver node.

For instance, in one example as applied in scenario 830 where the third transport block portion (or third CBGs) 714 is replaced with blanking portion 814 based on executing the non-modified data encoding relay mode 109, the relay UE 104b may further execute the third transmit resource handling technique 1300 to determine whether to apply power boosting to one or more remaining used (non-blanked) REs in an identified partial symbol, such as symbol 6 and symbol 8 in this scenario. For example, the relay UE 104b may determine to apply power boosting to the occupied REs 1010 in symbol 6 corresponding to the second transport block portion 712. As such, the occupied REs 1010 may be transformed to power boosted REs 1302. As noted above, whether and how much to boost the occupied REs 1010 may be based on compared the per-symbol transmit power to a threshold transmit power.

Similarly, the relay UE 104b may identify partial symbol 8 and determine whether power boosting may be applied to one or more of the occupied REs based on the third transmit resource handling technique 1300. In the example scenario, the UE 104b may determine to boost the transmit power of some of the occupied REs in symbol 8. For instance, the relay UE 104b may determine to apply power boosting to the occupied REs 1204 corresponding to the fourth transport block portion 714, based on the logic mentioned above, to transform the occupied REs 1204 to power boosted REs 1304. Additionally, for example, the relay UE 104b may determine to not apply power boosting to the occupied REs corresponding to the third reference signal 708 based on the rule that the EPRE for a RS may not be boosted.

Thus, in this case, the relay UE 104b executing the third transmit resource handling technique 1300 generates transport block 1306 that includes one or more power boosted REs, e.g., REs 1302 and 1304, in one or more partial symbols for relaying to the receiver node.

Figure 14:
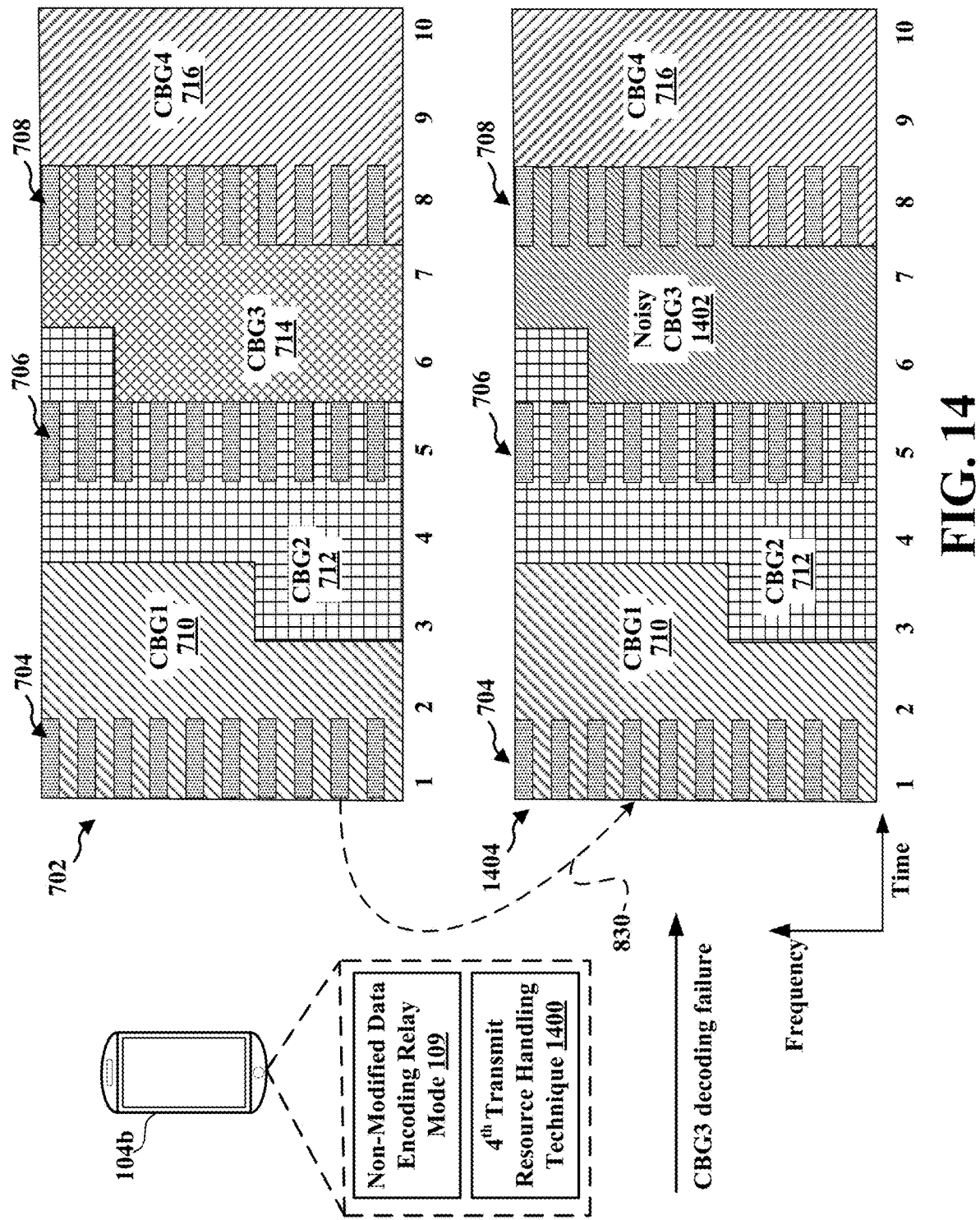
FIG. 14 is a schematic diagram of another example transmit resource handling technique.

Referring to FIG. 14, an example of a fourth transmit resource handling technique 1400 executed by the relay UE 104b includes generating or applying a modified transmit configuration to perform amplify-and-forward relaying of one or more unsuccessfully decoded transport block portions (or CBGs). According to operation of this technique, instead of blanking an unsuccessfully decoded transport block portion (or CBG), the relay UE 104b may transmit a properly scaled version of the noisy received signal on the same resource. In other words, the relay UE 104b executing the fourth transmit resource handling technique 1400 takes the received version, e.g., as received from the transmitting node, of the encoded transport block portion (or CBG) that was not successfully decoded, and hence may be referred to as a "noisy" received signal, and maps the received version of the encoded transport block portion (or CBG) into the same corresponding resource allocation. Additionally, the relay UE 104b executing the fourth transmit resource handling technique 1400 may apply scaling to transmit power of the received version of the encoded transport block portion (or CBG), e.g., to adjust the transmit power per-symbol of one or more symbols associated with the REs to be at or within a certain threshold level, and/or within a certain relative transmit power level with respect to one or more adjacent symbols. Thus, even though the relay UE 104b fails decoding the received the encoded transport block portion (or CBG), the relay UE 104b may relay the noisy signal, as the receiver node may succeed in decoding such a noisy signal, such as after combining the noisy signal with another redundant copy received on another link, such as the access link 120a AL or on another sidelink.

For instance, in one example as applied in scenario 830 where the third transport block portion (or third CBGs) 714 is unsuccessfully decoded, the relay UE 104b may further execute the fourth transmit resource handling technique 1400 to map the received version 1402, e.g., as received from the transmitting node, of the encoded the third transport block portion (or third CBGs) 714 into the same corresponding resources. Further, the relay UE 104b executing the fourth transmit resource handling technique 1400 may apply scaling to adjust the transmit power level of the received version 1402, or noisy signal, as described above. As such, the received version 1402 may be transformed to a scaled received version of the encoded the third transport block portion (or third CBGs) 714.

Thus, in this case, the relay UE 104b executing the fourth transmit resource handling technique 1400 generates transport block 1404 that includes one or more (scaled) received versions of one or more encoded transport block portions (or CBGs), which were not successfully decoded, for relaying to the receiver node.

Figure 15:
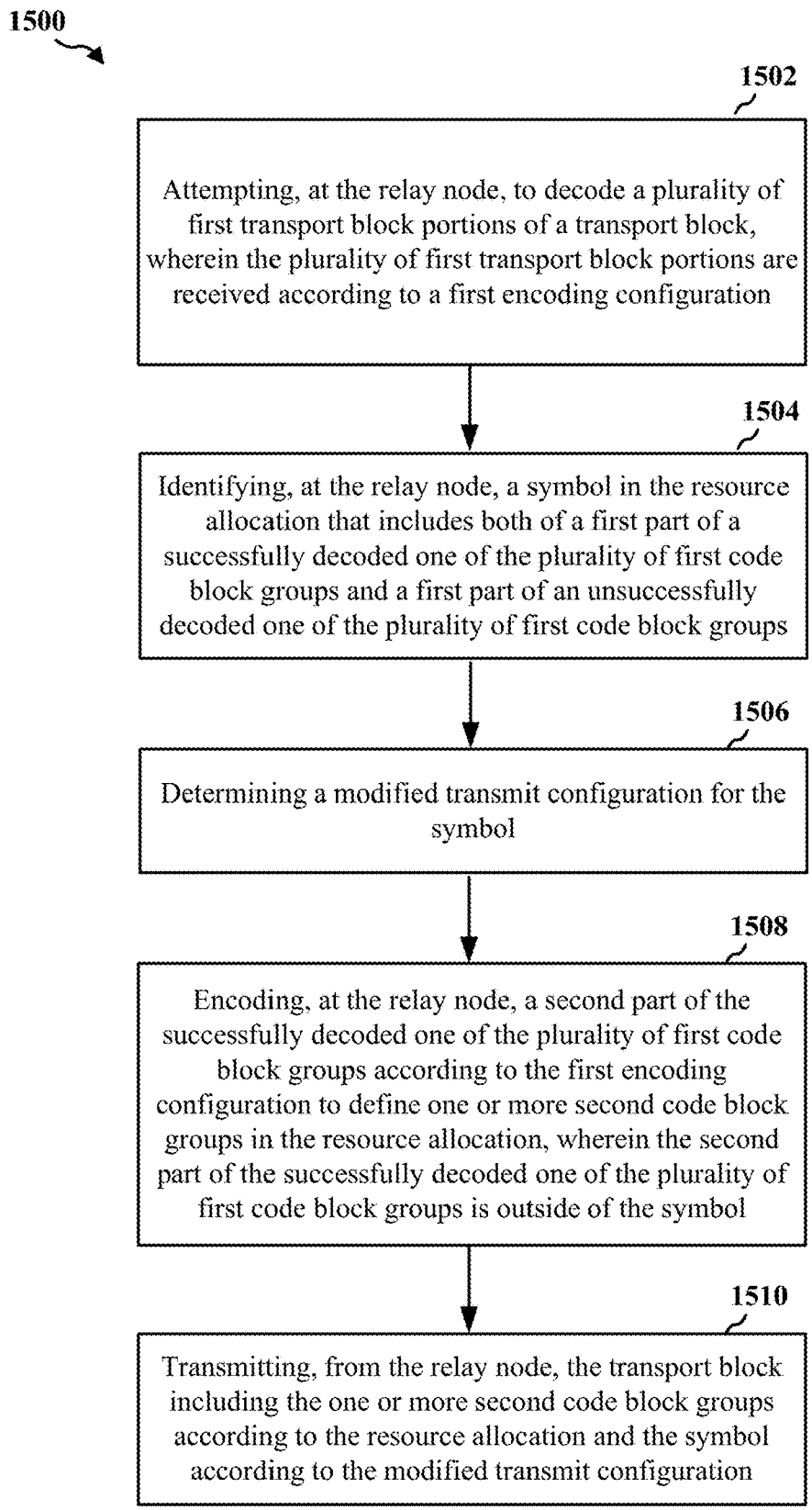
FIG. 15 is a flowchart of an example method of wireless communication of a relay UE operable in the system of FIG. 1.
Figure 17:
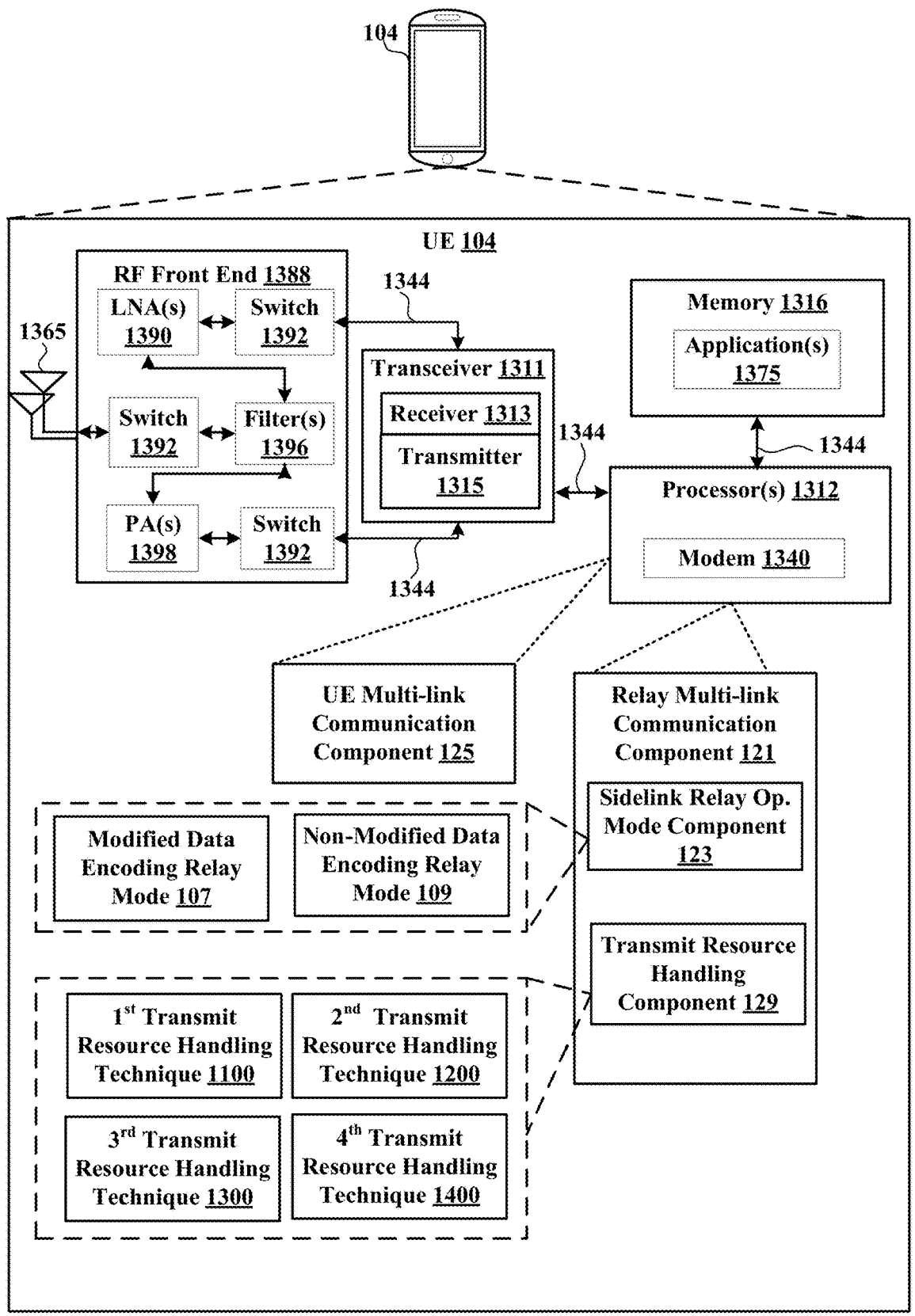
FIG. 17 is a block diagram of an example UE, in accordance with various aspects of the present disclosure.

Referring to FIG. 15, an example method 1500 of wireless communication may be performed by the relay UE 104b, which may include one or more components or functions as discussed in FIG. 1, 4, or 17, and which may operate according to the non-modified-data encoding relay mode 109 as discussed above with regard to FIGS. 5, 6, 8, and 9, and according to one or more of the transmit resource handling techniques of transmit resource handling component 129 to avoid abrupt transmit power variations when transmitting relayed transport blocks as discussed above with regard to FIGS. 10-14. Such techniques include: the first transmit resource handling technique 1100 for padding partially blanked symbols; the second transmit resource handling technique 1200 for discarding data/signals in partially blanked symbols; the third transmit resource handling technique 1300 for applying power boosting to resource elements containing data or signals in a partially blanked symbol; and/or, the fourth transmit resource handling technique 1400 to amplify-and-forward an entire unsuccessfully decoded transport block portion (or CBG), instead of blanking it.

At 1502, method 1500 includes attempting, at the relay node, to decode a plurality of first code block groups of a transport block, wherein the plurality of first code block groups are received in a resource allocation and according to a first encoding configuration. For example, in an aspect, the relay UE 104b may operate one or any combination of antennas 1365, RF front end 1388, transceiver 1311, processor 1312, memory 1316, modem 1340, or relay multi-link communication component 121 to attempt to decode a plurality of first transport block portions of a transport block, which may be transmitted in a signal received by the relay UE 104b from the base station 102a or the sidelink-assisted multi-link UE 104a. For example, any of the above components may include encoding and decoding algorithms for one or more different wireless communication protocols. Aspect regarding the encoding configuration is discussed above in more detail with respect to FIGS. 5, 6, 8, and 9.

At 1504, method 1500 includes identifying, at the relay node, a symbol in the resource allocation that includes both of a first part of a successfully decoded one of the plurality of first code block groups and a first part of an unsuccessfully decoded one of the plurality of first code block groups. For example, in an aspect, the relay UE 104*b* may operate one or any combination of transmit resource handling component 129, processor 1312, memory 1316, or modem 1340, to attempt to identify a symbol in the resource allocation that includes both of a first part of a successfully decoded one of the plurality of first code block groups and a first part of an unsuccessfully decoded one of the plurality of first code block groups.

At 1506, method 1500 includes determining a modified transmit configuration for the symbol. For example, in an aspect, the relay UE 104*b* may operate one or any combination of transmit resource handling component 129, processor 1312, memory 1316, or modem 1340, to determine a modified transmit configuration for the symbol, such as is discussed above in detail with regard to FIGS. 10-14.

At 1508, method 1500 includes encoding, at the relay node, a second part of the successfully decoded one of the plurality of first code block groups according to the first encoding configuration to define one or more second code block groups in the resource allocation, wherein the second part of the successfully decoded one of the plurality of first code block groups is outside of the symbol. For example, in an aspect, the relay UE 104*b* may operate one or any combination of processor 1312, memory 1316, modem 1340, or relay multi-link communication component 121 to attempt to encode a second part of the successfully decoded one of the plurality of first code block groups according to the first encoding configuration to define one or more second code block groups in the resource allocation, wherein the second part of the successfully decoded one of the plurality of first code block groups is outside of the symbol. For example, any of the above components may include encoding and decoding algorithms for one or more different wireless communication protocols. Aspect regarding the encoding configuration is discussed above in more detail with respect to FIGS. 5, 6, 8, and 9.

At 1510, method 1500 includes transmitting, from the relay node, the transport block including the one or more second code block groups according to the resource allocation and the symbol according to the modified transmit configuration. For example, in an aspect, the relay UE 104*b* may operate one or any combination of antennas 1365, RF front end 1388, transceiver 1311, processor 1312, memory 1316, modem 1340, transmit resource handling component 129, or relay multi-link communication component 121 to transmit the transport block including the one or more second code block groups according to the resource allocation and the symbol according to the modified transmit configuration. Aspect regarding the encoding configuration is discussed above in more detail with respect to FIGS. 5, 6, 8, and 9. Aspects regarding the transmit resource handling and modified transmit configuration are discussed above in detail with regard to FIGS. 10-14

In some implementations, at 1510, transmitting the symbol according to the modified transmit configuration comprises replacing the first part of the unsuccessfully decoded one of the plurality of first code block groups with a known padding signal.

In some implementations, at 1510, transmitting the symbol according to the modified transmit configuration comprises replacing resource elements of both the first part of the successfully decoded one of the plurality of first code block groups and the first part of the unsuccessfully decoded one of the plurality of first code block groups with blank resource elements.

In some implementations that involve replacing resource elements of both the first part of the successfully decoded one of the plurality of first code block groups and the first part of the unsuccessfully decoded one of the plurality of first code block groups with blank resource elements, method 1500 may further include determining a number of resource elements occupied by the first part of the successfully decoded one of the plurality of first code block groups, determining whether the number of resource elements is less than a threshold number, and the replacing the first part of the successfully decoded one of the plurality of first code block groups with the blank is in response to the number of resource elements being less than the threshold number.

In some implementations that involve replacing resource elements of both the first part of the successfully decoded one of the plurality of first code block groups and the first part of the unsuccessfully decoded one of the plurality of first code block groups with blank resource elements, method 1500 may further include determining whether the symbol includes a reference signal, and the replacing of the resource elements of the first part of the successfully decoded one of the plurality of first code block groups with blank resource elements is in response to the symbol not including the reference signal.

In some implementations, at 1510, transmitting the symbol according to the modified transmit configuration comprises boosting a transmit power of the first part of the successfully decoded one of the plurality of first code block groups.

In some implementations, method 1500 may further include identifying, at the relay node, a second symbol in the resource allocation that includes only a respective unsuccessfully decoded first code block group, determining a second modified transmit configuration for the second symbol, and the transmitting of the transport block further comprises transmitting the second symbol according to the second modified transmit configuration.

In some implementations of method 1500, transmitting the second symbol according to the second modified transmit configuration comprises replacing resource elements of the respective unsuccessfully decoded first code block group with blank resource elements.

In some implementations of method 1500, where the symbol and the second symbol contain separate parts of a first unsuccessfully decoded one of the plurality of first code block groups, and wherein transmitting the symbol according to the modified transmit configuration and wherein transmitting the second symbol according to the second modified transmit configuration comprises transmitting a scaled version of the first unsuccessfully decoded one of the plurality of first code block groups on the resource allocation corresponding to the symbol and the second symbol.

Figure 16:
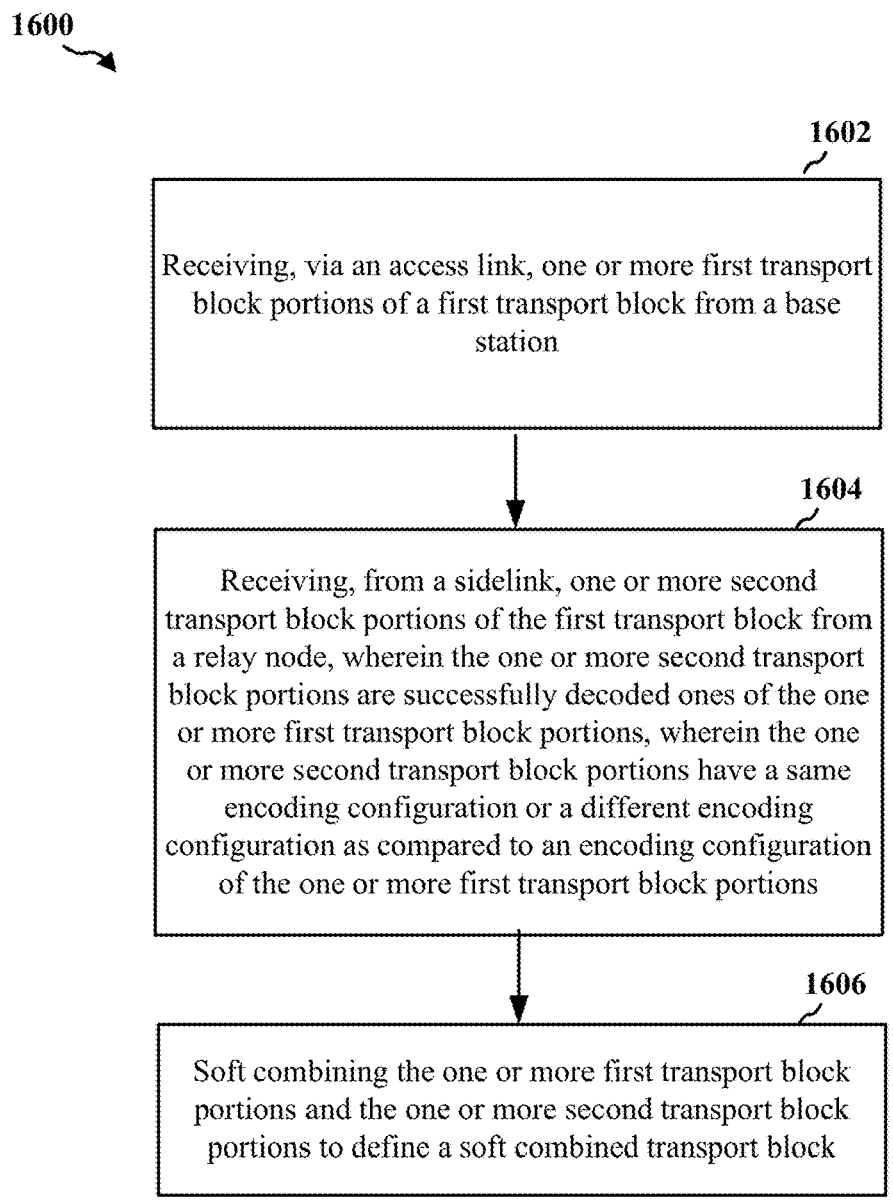
FIG. 16 is a flowchart of another example method of wireless communication of a receiver node operable in the system of FIG. 1.
Figure 18:
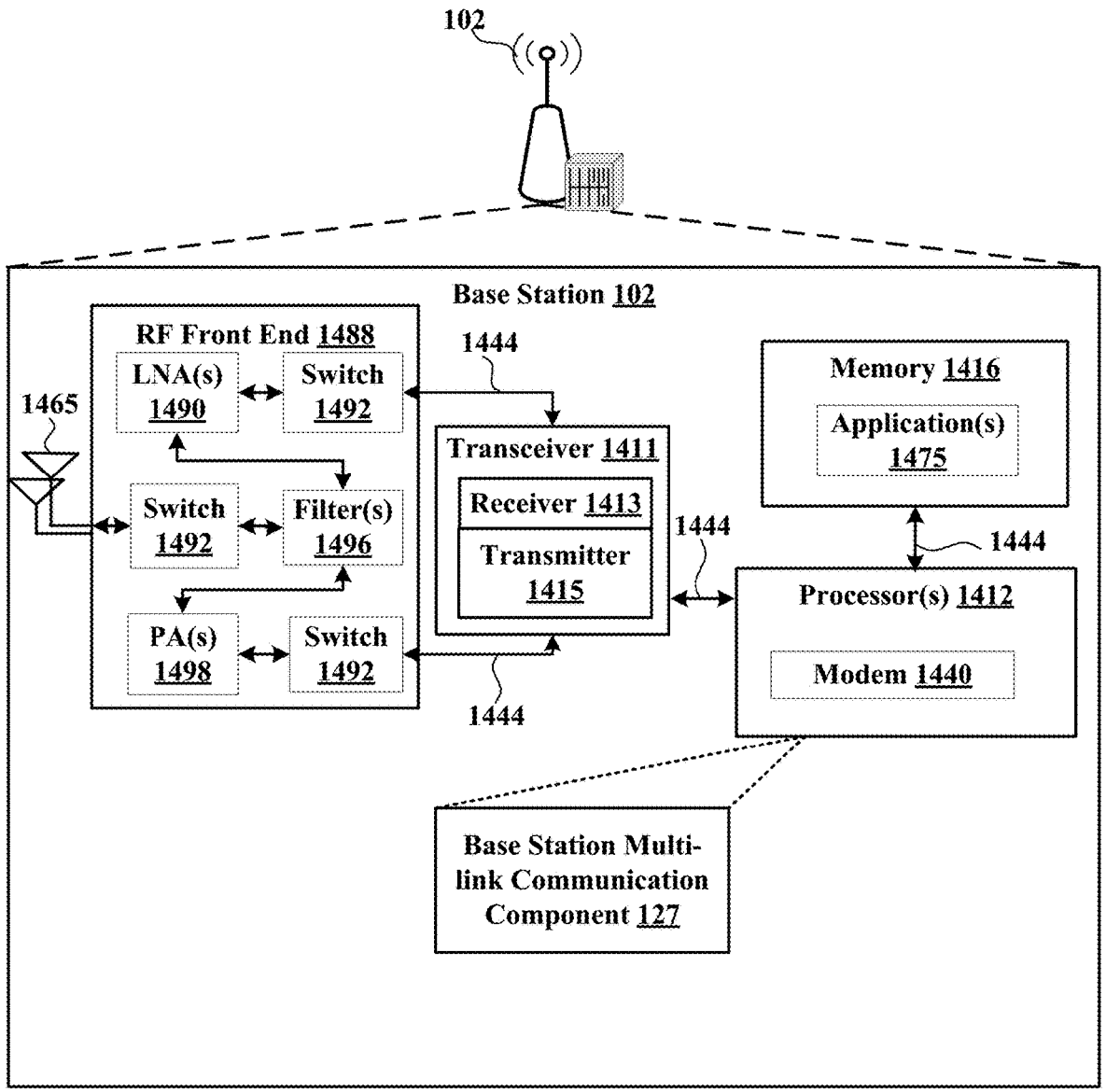
FIG. 18 is a block diagram of an example base station, in accordance with various aspects of the present disclosure.

Referring to FIG. 16, an example method 1600 of wireless communication may be performed by a receiver node, such as the sideline-assisted multi-link UE 104*a* or base station 102*a*, which may include one or more components or functions as discussed in FIG. 1, 4, or 18, and which may operate in conjunction with the relay UE 104*b* communicating according to the non-modified-data encoding relay mode 109 and transmit resource handling component 129, including the transmit resource handling techniques as discussed above with regard to FIGS. 10-14.

At 1602, method 1600 includes receiving, via an access link, one or more first transport block portions of a first transport block. For example, in an aspect, the sideline-assisted multi-link UE 104 or base station 102*a*, and/or a modem, processor, receiver chain component, and/or memory thereof may be executed to receive one or more first transport block portions of a first transport block, such as from received wireless signals, as discussed in detail above with respect to FIGS. 5, 6, and 8-14.

At 1604, method 1600 includes receiving, from a sidelink, one or more second transport block portions of the first transport block from a relay node, wherein the one or more second transport block portions are successfully decoded ones of the one or more first transport block portions, wherein the one or more second transport block portions have a second transmission configuration that is a different from a first transmission configuration of the one or more first transport block portions. For example, in an aspect, the sideline-assisted multi-link UE 104*a* or base station 102*a*, and/or a modem, processor, receiver chain component, and/or memory thereof may be executed to receive, from a sidelink, one or more second transport block portions of the first transport block from a relay node, wherein the one or more second transport block portions are successfully decoded ones of the one or more first transport block portions, wherein the one or more second transport block portions have a second transmission configuration that is a different from a first transmission configuration of the one or more first transport block portions, such as from received wireless signals, as discussed in detail above with respect to FIGS. 5, 6, and 8-14.

At 1606, method 1600 includes decoding the one or more first transport block portions and the one or more second transport block portions. For example, in an aspect, the sideline-assisted multi-link UE 104*a* or base station 102*a*, and/or a modem, processor, receiver chain component, and/or memory thereof may be executed to decode the one or more first transport block portions and the one or more second transport block portions. For example, any of the above components may execute one of a plurality of different decoding algorithms to decode the signal, as discussed in detail above with respect to FIGS. 5, 6, and 8-14.

In an implementation of method 1600, the second transmission configuration may differ from the first transmission configuration by padding partial symbols, or by discarding partial symbols, or by power boosting partial symbols, or by relaying unsuccessfully decoded ones of the one or more first transport block portions.

In an implementation, method 1600 may include soft combining the one or more first transport block portions and the one or more second transport block portions to define a soft combined transport block. In some cases, the soft combining is performed before or after demodulating the one or more first transport block portions and the one or more second transport block portions.

In an implementation of method 1600, the one or more first transport block portions and the one or more second transport block portions may comprise one or more code block groups.

In an implementation of method 1600, the receiver node comprises a user equipment.

In another implementation of method 1600, the receiver node comprises a base station.

Referring to FIG. 17, one example of an implementation of UE 104, including relay UE 104*b* and/or sidelink-assisted multi-link UE 104*a*, may include a variety of components, some of which have already been described above and are described further herein, including components such as one or more processors 1312 and memory 1316 and transceiver 1311 in communication via one or more buses 1344, which may operate in conjunction with modem 1340 and/or configuration component 198 for communicating sidelink capability information.

In an aspect, the one or more processors 1312 can include a modem 1340 and/or can be part of the modem 1340 that uses one or more modem processors. Thus, the various functions related to configuration component 198 may be included in modem 1340 and/or processors 1312 and, in an aspect, can be executed by a single processor, while in other aspects, different ones of the functions may be executed by a combination of two or more different processors. For example, in an aspect, the one or more processors 1312 may include any one or any combination of a modem processor, or a baseband processor, or a digital signal processor, or a transmit processor, or a receiver processor, or a transceiver processor associated with transceiver 1311. In other aspects, some of the features of the one or more processors 1312 and/or modem 1340 associated with configuration component 198 may be performed by transceiver 1311.

Also, memory 1316 may be configured to store data used herein and/or local versions of applications 1375 or communicating component 1342 and/or one or more of its subcomponents being executed by at least one processor 1312. Memory 1316 can include any type of computer-readable medium usable by a computer or at least one processor 1312, such as random access memory (RAM), read only memory (ROM), tapes, magnetic discs, optical discs, volatile memory, non-volatile memory, and any combination thereof. In an aspect, for example, memory 1316 may be a non-transitory computer-readable storage medium that stores one or more computer-executable codes defining configuration component 198 and/or one or more of its subcomponents, and/or data associated therewith, when UE 104 is operating at least one processor 1312 to execute configuration component 198 and/or one or more of its subcomponents.

Transceiver 1311 may include at least one receiver 1313 and at least one transmitter 1315. Receiver 1313 may include hardware and/or software executable by a processor for receiving data, the code comprising instructions and being stored in a memory (e.g., computer-readable medium). Receiver 1313 may be, for example, a radio frequency (RF) receiver. In an aspect, receiver 1313 may receive signals transmitted by at least one base station 102. Additionally, receiver 1313 may process such received signals, and also may obtain measurements of the signals, such as, but not limited to, Ec/Io, signal-to-noise ratio (SNR), reference signal received power (RSRP), received signal strength indicator (RSSI), etc. Transmitter 1315 may include hardware and/or software executable by a processor for transmitting data, the code comprising instructions and being stored in a memory (e.g., computer-readable medium). A suitable example of transmitter 1315 may including, but is not limited to, an RF transmitter.

Moreover, in an aspect, UE 104 may include RF front end 1388, which may operate in communication with one or more antennas 1365 and transceiver 1311 for receiving and transmitting radio transmissions, for example, wireless communications transmitted by at least one base station 102 or wireless transmissions transmitted by UE 104. The one or more antennas 1365 may include one or more antenna panels and/or sub-arrays, such as may be used for beamforming. RF front end 1388 may be connected to one or more antennas 1365 and can include one or more low-noise amplifiers (LNAs) 1390, one or more switches 1392, one or more power amplifiers (PAs) 1398, and one or more filters 1396 for transmitting and receiving RF signals.

In an aspect, LNA 1390 can amplify a received signal at a desired output level. In an aspect, each LNA 1390 may have a specified minimum and maximum gain values. In an aspect, RF front end 1388 may use one or more switches 1392 to select a particular LNA 1390 and its specified gain value based on a desired gain value for a particular application.

Further, for example, one or more PA(s) 1398 may be used by RF front end 1388 to amplify a signal for an RF output at a desired output power level. In an aspect, each PA 1398 may have specified minimum and maximum gain values. In an aspect, RF front end 1388 may use one or more switches 1392 to select a particular PA 1398 and its specified gain value based on a desired gain value for a particular application.

Also, for example, one or more filters 1396 can be used by RF front end 1388 to filter a received signal to obtain an input RF signal. Similarly, in an aspect, for example, a respective filter 1396 can be used to filter an output from a respective PA 1398 to produce an output signal for transmission. In an aspect, each filter 1396 can be connected to a specific LNA 1390 and/or PA 1398. In an aspect, RF front end 1388 can use one or more switches 1392 to select a transmit or receive path using a specified filter 1396, LNA 1390, and/or PA 1398, based on a configuration as specified by transceiver 1311 and/or processor 1312.

As such, transceiver 1311 may be configured to transmit and receive wireless signals through one or more antennas 1365 via RF front end 1388. In an aspect, transceiver may be tuned to operate at specified frequencies such that UE 104 can communicate with, for example, one or more base stations 102 or one or more cells associated with one or more base stations 102. In an aspect, for example, modem 1340 can configure transceiver 1311 to operate at a specified frequency and power level based on the UE configuration of the UE 104 and the communication protocol used by modem 1340.

In an aspect, modem 1340 can be a multiband-multimode modem, which can process digital data and communicate with transceiver 1311 such that the digital data is sent and received using transceiver 1311. In an aspect, modem 1340 can be multiband and be configured to support multiple frequency bands for a specific communications protocol. In an aspect, modem 1340 can be multimode and be configured to support multiple operating networks and communications protocols. In an aspect, modem 1340 can control one or more components of UE 104 (e.g., RF front end 1388, transceiver 1311) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1312 may correspond to one or more of the processors described in connection with the UE in FIG. 4. Similarly, the memory 1316 may correspond to the memory described in connection with the UE in FIG. 4.

Referring to FIG. 18, one example of an implementation of base station 102 (e.g., a base station 102, 102*a*, and/or 102*b*, as described above) may include a variety of components, some of which have already been described above, but including components such as one or more processors 1412 and memory 1416 and transceiver 1411 in communication via one or more buses 1444, which may operate in conjunction with modem 1440 and configuration component 199 for communicating sidelink capability information.

The transceiver 1411, receiver 1413, transmitter 1415, one or more processors 1412, memory 1416, applications 1475, buses 1444, RF front end 1488, LNAs 1490, switches 1492, filters 1496, PAs 1498, and one or more antennas 1465 may be the same as or similar to the corresponding components of UE 104, as described above, but configured or otherwise programmed for base station operations as opposed to UE operations.

In an aspect, the processor(s) 1412 may correspond to one or more of the processors described in connection with the base station in FIG. 4. Similarly, the memory 1416 may correspond to the memory described in connection with the base station in FIG. 4.

In the following, an overview of further examples of the present invention is provided. In some examples of the technology disclosed herein, a relay node attempts to decode a plurality of first code block groups of a transport block. In such examples, the plurality of first code block groups are received in a resource allocation and according to a first encoding configuration. The relay node identifies a symbol in the resource allocation that includes both of a first part of a successfully decoded one of the plurality of first code block groups and a first part of an unsuccessfully decoded one of the plurality of first code block groups. The relay node determines a modified transmit configuration for the symbol. The relay node encodes a second part of the successfully decoded one of the plurality of first code block groups according to the first encoding configuration to define one or more second code block groups in the resource allocation. The second part of the successfully decoded one of the plurality of first code block groups is outside of the symbol. The relay node then transmits the transport block including the one or more second code block groups according to the resource allocation and the symbol according to the modified transmit configuration.

In some such examples transmitting the symbol according to the modified transmit configuration includes replacing the first part of the unsuccessfully decoded one of the plurality of first code block groups with a known padding signal.

In variations on any of the above examples, transmitting the symbol according to the modified transmit configuration includes replacing resource elements of both the first part of the successfully decoded one of the plurality of first code block groups and the first part of the unsuccessfully decoded one of the plurality of first code block groups with blank resource elements.

Some variations of the examples above further include determining a number of resource elements occupied by the first part of the successfully decoded one of the plurality of first code block groups; determining whether the number of resource elements is less than a threshold number. In such variations replacing the first part of the successfully decoded one of the plurality of first code block groups with the blank is in response to the number of resource elements being less than the threshold number.

Some variations of the examples above further include determining whether the symbol includes a reference signal. In such variations, replacing the resource elements of the first part of the successfully decoded one of the plurality of first code block groups with blank resource elements is in response to the symbol not including the reference signal.

In some examples of each of the above examples, transmitting the symbol according to the modified transmit configuration includes boosting a transmit power of the first part of the successfully decoded one of the plurality of first code block groups.

Some variations of the examples above include identifying, at the relay node, a second symbol in the resource allocation that includes only a respective unsuccessfully decoded first code block group; determining a second modified transmit configuration for the second symbol. In such examples, transmitting the transport block further comprises transmitting the second symbol according to the second modified transmit configuration.

In some examples of each of the above examples, transmitting the second symbol according to the second modified transmit configuration comprises replacing resource elements of the respective unsuccessfully decoded first code block group with blank resource elements.

In some examples of each of the above examples, the symbol and the second symbol contain separate parts of a first unsuccessfully decoded one of the plurality of first code block groups. In such examples, transmitting the symbol according to the modified transmit configuration and transmitting the second symbol according to the second modified transmit configuration includes transmitting a scaled version of the first unsuccessfully decoded one of the plurality of first code block groups on the resource allocation corresponding to the symbol and the second symbol.

Some examples of the technology disclosed herein include a relay node device for wireless communication. The relay node include a memory configured to store instructions; and one or more processors communicatively coupled with the memory. The one or more processors are configured to execute the instructions to perform the operations of one or more of the methods of examples described above. Some examples of the technology disclosed herein include a relay node device for wireless communication, including means for performing the operations of one or more of the methods of examples described above.

Some examples of the technology disclosed herein include a non-transitory computer-readable medium storing instructions executable by one or more processors to perform the operations of one or more of the methods of examples described above.

In some examples of the technology disclosed herein, a receiver node receives, via an access link, one or more first transport block portions of a first transport block from a base station. The receiver node then receives, from a sidelink, one or more second transport block portions of the first transport block from a relay node. The one or more second transport block portions are successfully decoded ones of the one or more first transport block portions, and the one or more second transport block portions have a second transmission configuration that is a different from a first transmission configuration of the one or more first transport block portions. The receiver node decodes the one or more first transport block portions and the one or more second transport block portions. In some such examples, the second transmission configuration differs from the first transmission configuration by padding partial symbols, or by discarding partial symbols, or by power boosting partial symbols, or by relaying unsuccessfully decoded ones of the one or more first transport block portions.

In any of the receiver node examples, the receiver node can soft combine the one or more first transport block portions and the one or more second transport block portions to define a soft combined transport block. In some such examples, the soft combining is performed before or after demodulating the one or more first transport block portions and the one or more second transport block portions. In some of the receiver node examples, the one or more first transport block portions and the one or more second transport block portions comprise one or more code block groups. In some of the receiver node examples, the receiver node comprises a user equipment or a base station.

In some examples of the technology disclosed herein, a receiver node for wireless communication includes a memory configured to store instructions; and one or more processors communicatively coupled with the memory. The one or more processors are configured to execute the instructions to perform the operations of one or more of the methods of receiver node examples described above. In some examples of the technology disclosed herein, a receiver node for wireless communication includes means for performing the operations of one or more of the methods of receiver node examples described above. Some examples of the technology disclosed herein include a non-transitory computer-readable medium storing instructions executable by one or more processors to perform the operations of one or more of the methods of the receiver node examples described above.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a relay node, comprising:
    attempting, at a relay node, to decode a plurality of first code block groups of a transport block, wherein the plurality of first code block groups are received in a resource allocation and according to a first encoding configuration;
    identifying, at the relay node, a symbol in the resource allocation that includes both of a first part of a successfully decoded one of the plurality of first code block groups and a first part of an unsuccessfully decoded one of the plurality of first code block groups;
    determining a modified transmit configuration for the symbol based, least in part, on the first part of an unsuccessfully decoded one of the plurality of first code block groups and the first encoding configuration;
    encoding, at the relay node, a second part of the successfully decoded one of the plurality of first code block groups according to the first encoding configuration to define one or more second code block groups in the resource allocation, wherein the second part of the successfully decoded one of the plurality of first code block groups is outside of the symbol; and
    transmitting, from the relay node, the transport block including the one or more second code block groups according to the resource allocation and the symbol according to the modified transmit configuration.

2. The method of claim 1, wherein transmitting the symbol according to the modified transmit configuration comprises:
    replacing the first part of the unsuccessfully decoded one of the plurality of first code block groups with a known padding signal.

3. The method of claim 1, wherein transmitting the symbol according to the modified transmit configuration comprises:
    replacing resource elements of both the first part of the successfully decoded one of the plurality of first code block groups and the first part of the unsuccessfully decoded one of the plurality of first code block groups with blank resource elements.

4. The method of claim 3, further comprising:
    determining a number of resource elements occupied by the first part of the successfully decoded one of the plurality of first code block groups;
    determining whether the number of resource elements is less than a threshold number; and
    wherein replacing the first part of the successfully decoded one of the plurality of first code block groups with blank resource elements is in response to the number of resource elements being less than the threshold number.

5. The method of claim 3, further comprising:
    determining whether the symbol includes a reference signal; and
    wherein replacing the resource elements of the first part of the successfully decoded one of the plurality of first code block groups with blank resource elements is in response to the symbol not including the reference signal.

6. The method of claim 1, wherein transmitting the symbol according to the modified transmit configuration comprises:
    boosting a transmit power of the first part of the successfully decoded one of the plurality of first code block groups.

7. The method of claim 1, further comprising:
    identifying, at the relay node, a second symbol in the resource allocation that includes only a respective unsuccessfully decoded first code block group;
    determining a second modified transmit configuration for the second symbol; and
    wherein transmitting the transport block further comprises transmitting the second symbol according to the second modified transmit configuration.

8. The method of claim 7, wherein transmitting the second symbol according to the second modified transmit configuration comprises:
    replacing resource elements of the respective unsuccessfully decoded first code block group with blank resource elements.

9. The method of claim 7, wherein the symbol and the second symbol contain separate parts of a first unsuccessfully decoded one of the plurality of first code block groups, and wherein transmitting the symbol according to the modified transmit configuration and wherein transmitting the second symbol according to the second modified transmit configuration comprises transmitting a scaled version of the first unsuccessfully decoded one of the plurality of first code block groups on the resource allocation corresponding to the symbol and the second symbol.

10. A relay node device for wireless communication, comprising:
    a memory configured to store instructions; and
    one or more processors communicatively coupled with the memory, wherein the one or more processors are configured to execute the instructions such that the relay node device is configured to:
        attempt to decode a plurality of first code block groups of a transport block, wherein the plurality of first code block groups are received in a resource allocation and according to a first encoding configuration;
        identify a symbol in a resource allocation that includes both of a first part of a successfully decoded one of the plurality of first code block groups and a first part of an unsuccessfully decoded one of the plurality of first code block groups;
        determine a modified transmit configuration for the symbol based, least in part, on the first part of an unsuccessfully decoded one of the plurality of first code block groups and the first encoding configuration;
        encode a second part of the successfully decoded one of the plurality of first code block groups according to the first encoding configuration to define one or more second code block groups in the resource allocation, wherein the second part of the successfully decoded one of the plurality of first code block groups is outside of the symbol; and
        transmit the transport block including the one or more second code block groups according to the resource allocation and the symbol according to the modified transmit configuration.

11. The device of claim 10, wherein transmitting the symbol according to the modified transmit configuration comprises replacing the first part of the unsuccessfully decoded one of the plurality of first code block groups with a known padding signal.

12. The device of claim 10, wherein transmitting the symbol according to the modified transmit configuration comprises replacing resource elements of both the first part of the successfully decoded one of the plurality of first code block groups and the first part of the unsuccessfully decoded one of the plurality of first code block groups with blank resource elements.

13. The device of claim 12, wherein:
the one or more processors are configured further to execute the instructions to:
determine a number of resource elements occupied by the first part of the successfully decoded one of the plurality of first code block groups;
determine whether the number of resource elements is less than a threshold number; and
replacing the first part of the successfully decoded one of the plurality of first code block groups with blank resource elements is in response to the number of resource elements being less than the threshold number.

14. The device of claim 12, wherein:
the one or more processors are configured further to execute the instructions to determine whether the symbol includes a reference signal; and
replacing the resource elements of the first part of the successfully decoded one of the plurality of first code block groups with blank resource elements is in response to the symbol not including the reference signal.

15. The device of claim 10, wherein transmitting the symbol according to the modified transmit configuration comprises boosting a transmit power of the first part of the successfully decoded one of the plurality of first code block groups.

16. The device of claim 10, wherein:
the one or more processors are configured further to execute the instructions to:
identify, at the relay node, a second symbol in the resource allocation that includes only a respective unsuccessfully decoded first code block group; and
determine a second modified transmit configuration for the second symbol; and
transmitting the transport block further comprises transmitting the second symbol according to the second modified transmit configuration.

17. The device of claim 16, wherein transmitting the second symbol according to the second modified transmit configuration comprises replacing resource elements of the respective unsuccessfully decoded first code block group with blank resource elements.

18. The device of claim 16, wherein:
the symbol and the second symbol contain separate parts of a first unsuccessfully decoded one of the plurality of first code block groups; and
transmitting the symbol according to the modified transmit configuration and transmitting the second symbol according to the second modified transmit configuration comprises transmitting a scaled version of the first unsuccessfully decoded one of the plurality of first code block groups on the resource allocation corresponding to the symbol and the second symbol.

19. A relay node device for wireless communication, comprising:
means for attempting, at a relay node, to decode a plurality of first code block groups of a transport block, wherein the plurality of first code block groups are received in a resource allocation and according to a first encoding configuration;
means for identifying, at the relay node, a symbol in the resource allocation that includes both of a first part of a successfully decoded one of the plurality of first code block groups and a first part of an unsuccessfully decoded one of the plurality of first code block groups;
means for determining a modified transmit configuration for the symbol based, least in part, on the first part of an unsuccessfully decoded one of the plurality of first code block groups and the first encoding configuration;
means for encoding, at the relay node, a second part of the successfully decoded one of the plurality of first code block groups according to the first encoding configuration to define one or more second code block groups in the resource allocation, wherein the second part of the successfully decoded one of the plurality of first code block groups is outside of the symbol; and
means for transmitting, from the relay node, the transport block including the one or more second code block groups according to the resource allocation and the symbol according to the modified transmit configuration.

20. The device of claim 19, wherein transmitting the symbol according to the modified transmit configuration comprises replacing the first part of the unsuccessfully decoded one of the plurality of first code block groups with a known padding signal.

21. The device of claim 19, wherein transmitting the symbol according to the modified transmit configuration comprises replacing resource elements of both the first part of the successfully decoded one of the plurality of first code block groups and the first part of the unsuccessfully decoded one of the plurality of first code block groups with blank resource elements.

22. The device of claim 21:
further comprising:
means for determining a number of resource elements occupied by the first part of the successfully decoded one of the plurality of first code block groups; and
means for determining whether the number of resource elements is less than a threshold number; and
wherein replacing the first part of the successfully decoded one of the plurality of first code block groups with blank resource elements is in response to the number of resource elements being less than the threshold number.

23. The device of claim 21:
further comprising means for determining whether the symbol includes a reference signal; and
wherein replacing the resource elements of the first part of the successfully decoded one of the plurality of first code block groups with blank resource elements is in response to the symbol not including the reference signal.

24. The device of claim 19, wherein transmitting the symbol according to the modified transmit configuration comprises boosting a transmit power of the first part of the successfully decoded one of the plurality of first code block groups.

25. A non-transitory computer-readable medium storing instructions executable by one or more processors to:
attempt, at a relay node, to decode a plurality of first code block groups of a transport block, wherein the plurality of first code block groups are received in a resource allocation and according to a first encoding configuration;
identify, at the relay node, a symbol in the resource allocation that includes both of a first part of a successfully decoded one of the plurality of first code block groups and a first part of an unsuccessfully decoded one of the plurality of first code block groups;

determine a modified transmit configuration for the symbol based, least in part, on the first part of an unsuccessfully decoded one of the plurality of first code block groups and the first encoding configuration;

encode, at the relay node, a second part of the successfully decoded one of the plurality of first code block groups according to the first encoding configuration to define one or more second code block groups in the resource allocation, wherein the second part of the successfully decoded one of the plurality of first code block groups is outside of the symbol; and transmit, from the relay node, the transport block including the one or more second code block groups according to the resource allocation and the symbol according to the modified transmit configuration.

26. The medium of claim 25, wherein transmitting the symbol according to the modified transmit configuration comprises replacing the first part of the unsuccessfully decoded one of the plurality of first code block groups with a known padding signal.

27. The medium of claim 25, wherein transmitting the symbol according to the modified transmit configuration comprises replacing resource elements of both the first part of the successfully decoded one of the plurality of first code block groups and the first part of the unsuccessfully decoded one of the plurality of first code block groups with blank resource elements.

28. The medium of claim 27:

further storing instructions executable by one or more processors to:

determine a number of resource elements occupied by the first part of the successfully decoded one of the plurality of first code block groups;

determine whether the number of resource elements is less than a threshold number; and wherein replacing the first part of the successfully decoded one of the plurality of first code block groups with blank resource elements is in response to the number of resource elements being less than the threshold number.

29. The medium of claim 27:

further storing instructions executable by one or more processors to determine whether the symbol includes a reference signal; and wherein replacing the resource elements of the first part of the successfully decoded one of the plurality of first code block groups with blank resource elements is in response to the symbol not including the reference signal.

30. The medium of claim 25, wherein transmitting the symbol according to the modified transmit configuration comprises boosting a transmit power of the first part of the successfully decoded one of the plurality of first code block groups.

* * * * *